US010271306B2

(12) United States Patent
Feng et al.

(10) Patent No.: US 10,271,306 B2
(45) Date of Patent: Apr. 23, 2019

(54) DATA TRANSMISSION METHOD, APPARATUS, AND SYSTEM

(71) Applicant: Huawei Technologies Co., Ltd., Shenzhen (CN)

(72) Inventors: Shulan Feng, Beijing (CN); Han Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 169 days.

(21) Appl. No.: 15/186,190

(22) Filed: Jun. 17, 2016

(65) Prior Publication Data

US 2016/0302173 A1     Oct. 13, 2016

Related U.S. Application Data

(63) Continuation of application No. PCT/CN2014/094067, filed on Dec. 17, 2014.

(30) Foreign Application Priority Data

Dec. 17, 2013   (CN) .......................... 2013 1 0694567

(51) Int. Cl.
*H04W 72/02* (2009.01)
*H04W 72/04* (2009.01)
(Continued)

(52) U.S. Cl.
CPC ......... *H04W 72/02* (2013.01); *H04W 72/042* (2013.01); *H04W 72/0473* (2013.01);
(Continued)

(58) Field of Classification Search
None
See application file for complete search history.

(56) References Cited

U.S. PATENT DOCUMENTS

2005/0031344 A1   2/2005   Sato et al.
2011/0249640 A1*  10/2011  Soong .................. H04B 7/2606
                                                       370/329
(Continued)

FOREIGN PATENT DOCUMENTS

CN       1427781 A      7/2003
CN     102164425 A      8/2011
(Continued)

OTHER PUBLICATIONS

Fouad et al (An Autonomous resource block assignment scheme for OFDMA-Based Relays-Assisted Cellular Networks, IEEE Trans on Wireless Communication, vol. 11, No. 2, Feb. 2012).*
(Continued)

Primary Examiner — Kodzovi Acolatse
(74) Attorney, Agent, or Firm — Leydig, Voit & Mayer, Ltd.

(57) ABSTRACT

A data transmission method, apparatus, and system are disclosed. The method includes: determining, by a first HCD, a target communication resource in a first time period; determining, by the first HCD, a third target communication sub-resource used to transmit data between a first LCD and the first HCD, and sending third indication information to the first LCD by using a fourth target communication sub-resource, where the third indication information is used to indicate the third target communication sub-resource; and receiving, by the first HCD, first target data that is sent by the first LCD by using the third target communication sub-resource, and transmitting the first target data to the access network device; and/or acquiring, by the first HCD, second target data from the access network device, and sending the second target data to the first LCD by using the third target communication sub-resource.

22 Claims, 12 Drawing Sheets

(51) Int. Cl.
*H04W 76/10* (2018.01)
*H04L 5/00* (2006.01)
*H04W 88/04* (2009.01)

(52) U.S. Cl.
CPC ........... *H04W 76/10* (2018.02); *H04L 5/0048* (2013.01); *H04L 5/0053* (2013.01); *H04W 88/04* (2013.01)

(56) References Cited

U.S. PATENT DOCUMENTS

| | | | |
|---|---|---|---|
| 2012/0195216 A1* | 8/2012 | Wu | H04W 72/0486 370/252 |
| 2012/0203905 A1 | 8/2012 | Lee et al. | |
| 2013/0012191 A1* | 1/2013 | Charbit | H04W 52/143 455/422.1 |
| 2013/0294331 A1 | 11/2013 | Wang et al. | |
| 2013/0294399 A1* | 11/2013 | Lee | H04W 4/005 370/330 |
| 2014/0066119 A1* | 3/2014 | Tavildar | H04W 52/46 455/522 |
| 2014/0126460 A1* | 5/2014 | Bienas | H04W 74/002 370/315 |
| 2015/0031406 A1* | 1/2015 | Fouad | H04W 16/10 455/509 |
| 2015/0172387 A1* | 6/2015 | Ge | H04W 4/70 370/254 |
| 2015/0173060 A1* | 6/2015 | Ge | H04W 72/048 370/252 |

FOREIGN PATENT DOCUMENTS

| | | |
|---|---|---|
| CN | 102625271 A | 8/2012 |
| CN | 103200637 A | 7/2013 |
| KR | 101286586 B1 | 7/2013 |
| KR | 101338489 B1 | 12/2013 |
| WO | 2012050383 A2 | 4/2012 |
| WO | 2012173530 A1 | 12/2012 |

OTHER PUBLICATIONS

"ProSe UE-to-Network Relays," SA WG2 Meeting #98, Valencia, Spain, pp. 1-9, S2-132455, 3rd Generation Partnership Project, Valbonne, France (Jul. 15-19, 2013).

"Update and Evaluation UE-to-network relay solution R12," 3GPP TSG SA WG2 Meeting #100, San Francisco, USA, pp. 1-5, S2-134066, 3rd Generation Partnership Project, Valbonne, France, (Nov. 11-15, 2013).

* cited by examiner

200

A first HCD determines a target communication resource in a first time period, where: the target communication resource is different from a downlink system communication resource in a system communication resource; the system communication resource is a resource used to transmit data or signaling between the access network device and the HCD; and the downlink system communication resource is a resource used by the access network device when the access network device transmits data or signaling to the HCD in the first time period — S210

The first HCD sends first indication information by using a first target communication sub-resource in the target communication resource, where the first indication information is used to indicate that the first HCD Is capable of transmitting data for the at least one LCD — S220

The first HCD receives second indication information that is sent by the first LCD by using a second target communication sub-resource in the target communication resource, where the second target communication sub-resource is corresponding to the first target communication sub-resource, and the second indication information is sent by the first LCD according to the first indication information and used to indicate that the first LCD requests to transmit data via the first HCD — S230

The first HCD determines, from the target communication resource according to the second indication information, a third target communication sub-resource used to transmit data between the first LCD and the first HCD, and sends third indication information to the first LCD by using a fourth target communication sub-resource in the target communication resource, where the third indication information is used to instruct the first LCD to perform data transmission with the first HCD by using the third target communication sub-resource — S240

The first HCD receives first target data that is sent by the first LCD by using the third target communication sub-resource, and transmits the first target data to the access network device; and/or the first HCD acquires second target data from the access network device, and sends the second target data to the first LCD by using the third target communication sub-resource — S250

A first LCD detects, in a first time period, first indication information that is sent by a first HCD by using a first target communication sub-resource in a target communication resource, where: the first indication information is used to indicate that the first HCD is capable of transmitting data for the at least one LCD; the target communication resource is determined by the first HCD, and the target communication resource is different from a downlink system communication resource in a system communication resource; the system communication resource is a resource used to transmit data or signaling between the access network device and the HCD; and the downlink system communication resource is a resource used by the access network device when the access network device transmits data or signaling to the HCD in the first time period ⸺ S310

↓

The first LCD sends second indication information to the first HCD according to the first indication information by using a second target communication sub-resource in the target communication resource, where the second target communication sub-resource is corresponding to the first target communication sub-resource, and the second indication information is used to indicate that the first LCD requests to transmit data via the first HCD ⸺ S320

↓

The first LCD receives third indication information that is sent by the first HCD and used to indicate a third target communication sub-resource, and determines the third target communication sub-resource according to the third indication information, where the third target communication sub-resource is determined by the first HCD from the target communication resource and used to transmit data between the first LCD and the first HCD, and the third indication information is sent by the first HCD according to the second indication information by using a fourth target communication sub-resource in the target communication resource ⸺ S330

↓

The first LCD sends first target data sent to the first HCD by using the third target communication sub-resource, so that the first HCD transmits the first target data to the access network device; and/or the first LCD receives second target data that is sent by the first HCD by using the third target communication sub-resource, where the second target data is acquired by the first HCD from the access network device ⸺ S340

FIG. 8

DATA TRANSMISSION METHOD, APPARATUS, AND SYSTEM

CROSS-REFERENCE TO RELATED APPLICATIONS

This application is a continuation of International Application No. PCT/CN2014/094067, filed on Dec. 17, 2014, which claims priority to Chinese Patent Application No. 201310694567.9, filed on Dec. 17, 2013, both of which are hereby incorporated by reference in their entireties.

TECHNICAL FIELD

The present invention relates to the communications field, and more specifically, to a data transmission method, apparatus, and system.

BACKGROUND

A smart city can achieve comprehensive perception, interconnection, and convergence of information, thereby greatly enriching people's life and communication. Building a smart city is inseparable from an information detection and transmission system that is based on, for example, the Internet of Things (MTC, machine type communication). The Internet of Things detects and collects information about a surrounding environment system by using widely distributed sensors, and transmits the information to a cloud computing-oriented information processing center by using a wireless transmission system.

Currently, a technology is known, in which, for example, user equipment (UE) in a Long Term Evolution (LTE) system is properly simplified, for example, only a single mode, a single band, a single RF chain, or a single antenna mode is performed, and the simplified user equipment is used as MTC user equipment, so that the MTC user equipment (hereinafter MTC UE for short) can access LTE. Because the MTC UE uses a simplification technology, an access range of an LTE network that the MTC UE can access is 5-9 dB or even more less than an access range of the user equipment in LTE (hereinafter LTE UE for short).

On the other hand, for example, a smart metering (such as a water meter and an electricity meter) system in the MTC UE is generally deployed in a basement, which leads to an increase of a transmission path loss (about 20 dB); therefore, in comparison with the LTE UE, a 20 dB additional loss is introduced (or rather, the access range decreases by 20 dB).

That is, in general, in comparison with the LTE UE, the access range of the MTC UE decreases by about 30 dB; as a result, the MTC UE cannot access a base station, which seriously affects a communication effect, a use effect, and user experience of the MTC UE.

To compensate for this part of loss, it is proposed that a multiple-retransmission technology be used in MTC, so as to enhance communication performance. However, by means of performance emulation, it is found that hundreds of retransmissions need to be performed in order to compensate for the 30 dB loss. On one hand, use efficiency of a radio spectrum is greatly reduced; on the other hand, a corresponding design modification to a base station is required by a retransmission mechanism, which causes incompatibility between a base station supporting MTC and a base station not supporting MTC, and further affects normal communication of the LTE UE.

Therefore, a technology is in need that can improve a communication effect and user experience of a low capability terminal device incapable of directly accessing an access network device.

SUMMARY

Embodiments of the present invention provide a data transmission method, apparatus, and system, which can improve a communication effect and user experience.

According to a first aspect, a data transmission method is provided, executed in a communications system including an access network device, at least one low capability terminal device LCD incapable of directly accessing the access network device, and at least one high capability terminal device HCD capable of directly accessing the access network device, where the method includes: determining, by a first HCD, a target communication resource in a first time period, where the target communication resource is different from a downlink system communication resource in a system communication resource; the system communication resource is a resource used to transmit data or signaling between the access network device and the HCD; and the downlink system communication resource is a resource used by the access network device when the access network device transmits data or signaling to the HCD in the first time period; sending, by the first HCD, first indication information to the at least one LCD by using a first target communication sub-resource in the target communication resource, where the first indication information is used to indicate that the first HCD is capable of transmitting data for the at least one LCD; receiving, by the first HCD, second indication information that is sent by the first LCD by using a second target communication sub-resource in the target communication resource, where the second target communication sub-resource is corresponding to the first target communication sub-resource, and the second indication information is sent by the first LCD according to the first indication information and used to indicate that the first LCD requests to transmit data via the first HCD; determining, by the first HCD from the target communication resource according to the second indication information, a third target communication sub-resource used to transmit data between the first LCD and the first HCD, and sending third indication information to the first LCD by using a fourth target communication sub-resource in the target communication resource, where the third indication information is used to instruct the first LCD to perform data transmission with the first HCD by using the third target communication sub-resource; and receiving, by the first HCD, first target data that is sent by the first LCD by using the third target communication sub-resource, and transmitting the first target data to the access network device; and/or acquiring, by the first HCD, second target data from the access network device, and sending the second target data to the first LCD by using the third target communication sub-resource.

With reference to the first aspect, in a first implementation manner of the first aspect, a time-frequency resource division manner of the target communication resource is the same as a time-frequency resource division manner of the system communication resource, and a data mapping manner of a reference signal carried by the target communication resource is a data mapping manner of a reference signal carried by the downlink system communication resource.

With reference to the first aspect and the foregoing implementation manner of the first aspect, in a second implementation manner of the first aspect, bandwidth of the target communication resource is less than or equal to bandwidth of the system communication resource.

With reference to the first aspect and the foregoing implementation manner of the first aspect, in a third implementation manner of the first aspect, before the receiving, by the first HCD, first target data that is sent by the first LCD by using the third target communication sub-resource, the method further includes: detecting, by the first HCD, a system signal, where the system signal is a signal used to carry data or signaling transmitted between the HCD and the access network device; determining, by the first HCD, target transmission power according to strength of the system signal; and sending, by the first HCD to the first LCD by using a fifth target communication sub-resource in the target communication resource, fourth indication information used to indicate the target transmission power, so as to instruct the first LCD to send the first target data according to the target transmission power by using the third target communication sub-resource.

With reference to the first aspect and the foregoing implementation manner of the first aspect, in a fourth implementation manner of the first aspect, the sending the second target data to the first LCD by using the third target communication sub-resource includes: detecting, by the first HCD, a system signal, where the system signal is a signal used to carry data or signaling transmitted between the HCD and the access network device; determining, by the first HCD, target transmission power according to strength of the system signal; and sending, by the first HCD, the second target data to the first LCD according to the target transmission power by using the third target communication sub-resource.

With reference to the first aspect and the foregoing implementation manner of the first aspect, in a fifth implementation manner of the first aspect, the first indication information is carried in a first synchronization signal; the first synchronization signal includes a first primary synchronization signal and a first secondary synchronization signal; a transmission relationship in a time domain between the first primary synchronization signal and the first secondary synchronization signal is different from a transmission relationship in a time domain between a second primary synchronization signal and a second secondary synchronization signal; the second primary synchronization signal and the second secondary synchronization signal are second synchronization signals; and the second synchronization signal is used to carry fifth indication information sent by the access network device, where the fifth indication information is used to indicate that the access network device is capable of transmitting data for the at least one HCD.

With reference to the first aspect and the foregoing implementation manner of the first aspect, in a sixth implementation manner of the first aspect, the at least one LCD is an Internet of Things terminal device.

With reference to the first aspect and the foregoing implementation manner of the first aspect, in a seventh implementation manner of the first aspect, the at least one HCD is a mobile terminal device.

According to a second aspect, a data transmission method is provided, executed in a communications system including an access network device, at least one low capability terminal device LCD incapable of directly accessing the access network device, and at least one high capability terminal device HCD capable of directly accessing the access network device, where the method includes: detecting, by a first LCD in a first time period, first indication information that is sent by a first HCD by using a first target communication sub-resource in a target communication resource, where the first indication information is used to indicate that the first HCD is capable of transmitting data for the at least one LCD; the target communication resource is determined by the first HCD, and the target communication resource is different from a downlink system communication resource in a system communication resource; the system communication resource is a resource used to transmit data or signaling between the access network device and the HCD; and the downlink system communication resource is a resource used by the access network device when the access network device transmits data or signaling to the HCD in the first time period; sending, by the first LCD, second indication information to the first HCD according to the first indication information by using a second target communication sub-resource in the target communication resource, where the second target communication sub-resource is corresponding to the first target communication sub-resource, and the second indication information is used to indicate that the first LCD requests to transmit data via the first HCD; receiving, by the first LCD, third indication information that is sent by the first HCD and used to indicate a third target communication sub-resource, and determining the third target communication sub-resource according to the third indication information, where the third target communication sub-resource is determined by the first HCD from the target communication resource and used to transmit data between the first LCD and the first HCD, and the third indication information is sent by the first HCD according to the second indication information by using a fourth target communication sub-resource in the target communication resource; and sending, by the first LCD, first target data to the first HCD by using the third target communication sub-resource, so that the first HCD transmits the first target data to the access network device; and/or receiving, by the first LCD, the second target data that is sent by the first HCD by using the third target communication sub-resource, where the second target data is acquired by the first HCD from the access network device.

With reference to the second aspect, in a first implementation manner of the second aspect, a time-frequency resource division manner of the target communication resource is the same as a time-frequency resource division manner of the system communication resource, and a data mapping manner of a reference signal carried by the target communication resource is a data mapping manner of a reference signal carried by the downlink system communication resource.

With reference to the second aspect and the foregoing implementation manner of the second aspect, in a second implementation manner of the second aspect, bandwidth of the target communication resource is less than or equal to bandwidth of the system communication resource.

With reference to the second aspect and the foregoing implementation manner of the second aspect, in a third implementation manner of the second aspect, the sending, by the first LCD, first target data to the first HCD by using the third target communication sub-resource includes: receiving, by the first LCD, fourth indication information that is sent by the first HCD by using a fifth target communication sub-resource in the target communication resource and used to indicate target transmission power, and determining the target transmission power according to the fourth indication information, where the target transmission power is determined by the first HCD according to strength of a system signal, and the system signal is a signal used to carry data or signaling transmitted between the HCD and the access network device; and sending, by the first LCD, the first target data to the first HCD according to the target transmission power by using the third target communication sub-resource.

With reference to the second aspect and the foregoing implementation manner of the second aspect, in a fourth implementation manner of the second aspect, the first indication information is carried in a first synchronization signal; the first synchronization signal includes a first primary synchronization signal and a first secondary synchronization signal; a transmission relationship in a time domain between the first primary synchronization signal and the first secondary synchronization signal is different from a transmission relationship in a time domain between a second primary synchronization signal and a second secondary synchronization signal; the second primary synchronization signal and the second secondary synchronization signal are second synchronization signals; and the second synchronization signal is used to carry fifth indication information sent by the access network device, where the fifth indication information is used to indicate that the access network device is capable of transmitting data for the at least one HCD.

With reference to the second aspect and the foregoing implementation manner of the second aspect, in a fifth implementation manner of the second aspect, the at least one LCD is an Internet of Things terminal device.

With reference to the second aspect and the foregoing implementation manner of the second aspect, in a sixth implementation manner of the second aspect, the at least one HCD is a mobile terminal device.

According to a third aspect, a data transmission apparatus is provided, where the apparatus includes: a determining unit, configured to determine a target communication resource in a first time period, where the target communication resource is different from a downlink system communication resource in a system communication resource; the system communication resource is a resource used to transmit data or signaling between the access network device and at least one high capability terminal device HCD capable of directly accessing the access network device; and the downlink system communication resource is a resource used by the access network device when the access network device transmits data or signaling to the HCD in the first time period; a sending unit, configured to send first indication information by using a first target communication sub-resource in the target communication resource, where the first indication information is used to indicate that the apparatus is capable of transmitting data for at least one low capability terminal device LCD incapable of directly accessing the access network device; and a receiving unit, configured to receive second indication information that is sent by the first LCD by using a second target communication sub-resource in the target communication resource, where the second target communication sub-resource is corresponding to the first target communication sub-resource, and the second indication information is sent by the first LCD according to the first indication information and used to indicate that the first LCD requests to transmit data via the apparatus; where the determining unit is further configured to determine, from the target communication resource according to the second indication information, a third target communication sub-resource used to transmit data between the first LCD and the apparatus; the sending unit is further configured to send third indication information to the first LCD by using a fourth target communication sub-resource in the target communication resource, where the third indication information is used to instruct the first LCD to perform data transmission with the apparatus by using the third target communication sub-resource; and the receiving unit is further configured to receive first target data that is sent by the first LCD by using the third target communication sub-resource, and transmit the first target data to the access network device; and/or the sending unit is further configured to send second target data acquired from the access network device to the first LCD by using the third target communication sub-resource.

With reference to the third aspect, in a first implementation manner of the third aspect, a time-frequency resource division manner of the target communication resource is the same as a time-frequency resource division manner of the system communication resource, and a data mapping manner of a reference signal carried by the target communication resource is a data mapping manner of a reference signal carried by the downlink system communication resource.

With reference to the third aspect and the foregoing implementation manner of the third aspect, in a second implementation manner of the third aspect, the determining unit is specifically configured to determine the target communication resource, so that bandwidth of the target communication resource is less than or equal to bandwidth of the system communication resource.

With reference to the third aspect and the foregoing implementation manner of the third aspect, in a third implementation manner of the third aspect, the apparatus further includes: a detecting unit, configured to detect a system signal, where the system signal is a signal used to carry data or signaling transmitted between the at least one HCD capable of directly accessing the access network device and the access network device, where the determining unit is further configured to determine the target transmission power according to strength of the system signal, and the sending unit is further configured to send, to the first LCD by using a fifth target communication sub-resource in the target communication resource, fourth indication information used to indicate the target transmission power, so that the first LCD sends the first target data according to the target transmission power by using the third target communication sub-resource.

With reference to the third aspect and the foregoing implementation manner of the third aspect, in a fourth implementation manner of the third aspect, the apparatus further includes: a detecting unit, configured to detect a system signal, where the system signal is a signal used to carry data or signaling transmitted between the at least one HCD capable of directly accessing the access network device and the access network device, where the determining unit is further configured to determine the target transmission power according to strength of the system signal, and the sending unit is specifically configured to send second target data to the first LCD according to the target transmission power by using the third target communication sub-resource.

With reference to the third aspect and the foregoing implementation manner of the third aspect, in a fifth implementation manner of the third aspect, the first indication information is carried in a first synchronization signal; the first synchronization signal includes a first primary synchronization signal and a first secondary synchronization signal; a transmission relationship in a time domain between the first primary synchronization signal and the first secondary synchronization signal is different from a transmission relationship in a time domain between a second primary synchronization signal and a second secondary synchronization signal; the second primary synchronization signal and the second secondary synchronization signal are second synchronization signals; and the second synchronization signal is used to carry fifth indication information sent by the access network device, where the fifth indication information is used to indicate that the access network device is capable of transmitting data for the at least one HCD.

With reference to the third aspect and the foregoing implementation manner of the third aspect, in a sixth implementation manner of the third aspect, the at least one LCD is an Internet of Things terminal device.

With reference to the third aspect and the foregoing implementation manner of the third aspect, in a seventh implementation manner of the third aspect, the apparatus is a mobile terminal device.

According to a fourth aspect, a data transmission apparatus is provided, where the apparatus includes: a receiving unit, configured to receive, in a first time period, first indication information sent by using a first target communication sub-resource in a target communication resource by a first HCD in at least one high capability terminal device HCD capable of directly accessing an access network device, where the first indication information is used to indicate that the first HCD is capable of transmitting data for the apparatus; the target communication resource is determined by the first HCD, and the target communication resource is different from a downlink system communication resource in a system communication resource; the system communication resource is a resource used to transmit data or signaling between the access network device and the HCD; and the downlink system communication resource is a resource used by the access network device when the access network device transmits data or signaling to the HCD in the first time period; a sending unit, configured to send second indication information to the first HCD according to the first indication information by using a second target communication sub-resource in the target communication resource, where the second target communication sub-resource is corresponding to the first target communication sub-resource, and the second indication information is used to indicate that the apparatus requests to transmit data via the first HCD; where the receiving unit is further configured to receive third indication information that is sent by the first HCD and used to indicate a third target communication sub-resource, where the third target communication sub-resource is determined by the first HCD from the target communication resource and used to transmit data between the first LCD and the first HCD, and the third indication information is sent by the first HCD according to the second indication information by using a fourth target communication sub-resource in the target communication resource; and a determining unit, configured to determine the third target communication sub-resource according to the third indication information, where the sending unit is further configured to send first target data to the first HCD by using the third target communication sub-resource, so that the first HCD transmits the first target data to the access network device, and/or the receiving unit is further configured to receive the second target data sent by the first HCD by using the third target communication sub-resource, where the second target data is acquired by the first HCD from the access network device.

With reference to the fourth aspect, in a first implementation manner of the fourth aspect, a time-frequency resource division manner of the target communication resource is the same as a time-frequency resource division manner of the system communication resource, and a data mapping manner of a reference signal carried by the target communication resource is a data mapping manner of a reference signal carried by the downlink system communication resource.

With reference to the fourth aspect and the foregoing implementation manner of the fourth aspect, in a second implementation manner of the fourth aspect, bandwidth of the target communication resource is less than or equal to bandwidth of the system communication resource.

With reference to the fourth aspect and the foregoing implementation manner of the fourth aspect, in a third implementation manner of the fourth aspect, the receiving unit is further configured to receive fourth indication information that is sent by the first HCD by using a fifth target communication sub-resource in the target communication resource and used to indicate target transmission power, where the target transmission power is determined by the first HCD according to strength of a system signal, and the system signal is a signal used to carry data or signaling transmitted between the HCD and the access network device; the determining unit is further configured to determine the target transmission power according to the fourth indication information; and the sending unit is specifically configured to send the first target data to the first HCD according to the target transmission power by using the third target communication sub-resource.

With reference to the fourth aspect and the foregoing implementation manner of the fourth aspect, in a fourth implementation manner of the fourth aspect, the first indication information is carried in a first synchronization signal; the first synchronization signal includes a first primary synchronization signal and a first secondary synchronization signal; a transmission relationship in a time domain between the first primary synchronization signal and the first secondary synchronization signal is different from a transmission relationship in a time domain between a second primary synchronization signal and a second secondary synchronization signal; the second primary synchronization signal and the second secondary synchronization signal are second synchronization signals; and the second synchronization signal is used to carry fifth indication information sent by the access network device, where the fifth indication information is used to indicate that the access network device is capable of transmitting data for the at least one HCD.

With reference to the fourth aspect and the foregoing implementation manner of the fourth aspect, in a fifth implementation manner of the fourth aspect, the apparatus is an Internet of Things terminal device.

With reference to the fourth aspect and the foregoing implementation manner of the fourth aspect, in a sixth implementation manner of the fourth aspect, the at least one HCD is a mobile terminal device.

According to a fifth aspect, a data transmission system is provided, where the system includes: an access network device; at least one high capability terminal device HCD capable of directly accessing the access network device, configured to: determine a target communication resource in a first time period; send first indication information by using a first target communication sub-resource in the target communication resource, where the first indication information is used to indicate that the apparatus is capable of transmitting data for at least one low capability terminal device LCD incapable of directly accessing the access network device; receive second indication information that is sent by the first LCD by using a second target communication sub-resource in the target communication resource, where the second target communication sub-resource is corresponding to the first target communication sub-resource, and the second indication information is sent by the first LCD according to the first indication information and used to indicate that the first LCD requests to transmit data via the apparatus; determine, from the target communication resource according to the second indication information, a third target communication sub-resource used to transmit data between the first LCD and the apparatus; send third indication information to the first LCD by using a fourth target communication sub-resource in the target communication resource, where the third indication information is used to indicate the third target communication sub-resource; and receive first target data that is sent by the first LCD by using the third target communication sub-resource, and transmit the first target data to the access network device; and/or send second target data acquired from the access network device to the first LCD by using the third target communication sub-resource; and at least one low capability terminal device LCD incapable of directly accessing the access network device, configured to: receive, in a first time period, first indication information sent by using a first target communication sub-resource in a target communication resource by a first HCD in at least one high capability terminal device HCD capable of directly accessing the access network device, where the first indication information is used to indicate that the first HCD is capable of transmitting data for the apparatus, and the target communication resource is determined by the first HCD; send second indication information to the first HCD according to the first indication information by using a second target communication sub-resource in the target communication resource, where the second target communication sub-resource is corresponding to the first target communication sub-resource, and the second indication information is used to indicate that the apparatus requests to transmit data via the first HCD; receive third indication information that is sent by the first HCD according to the second indication information by using a fourth target communication sub-resource in the target communication resource and used to indicate a third target communication sub-resource, where the third target communication sub-resource is determined by the first HCD from the target communication resource and used to transmit data between the first LCD and the first HCD; determine the third target communication sub-resource according to the third indication information; and send first target data to the first HCD by using the third target communication sub-resource, so that the first HCD transmits the first target data to the access network device; and/or receive the second target data sent by the first HCD by using the third target communication sub-resource, where the second target data is acquired by the first HCD from the access network device; the target communication resource is different from a downlink system communication resource in a system communication resource; the system communication resource is a resource used to transmit data or signaling between the access network device and the HCD; and the downlink system communication resource is a resource used by the access network device when the access network device transmits data or signaling to the HCD in the first time period.

With reference to the fifth aspect, in a first implementation manner of the fifth aspect, a time-frequency resource division manner of the target communication resource is the same as a time-frequency resource division manner of the system communication resource, and a data mapping manner of a reference signal carried by the target communication resource is a data mapping manner of a reference signal carried by the downlink system communication resource.

According to the data transmission method, apparatus, and system in the embodiments of the present invention, an HCD determines a communication resource used for data transmission with an LCD, and performs, with the LCD by using the communication resource, transmission of data that needs to be sent to an access network device or data acquired from the access network device, which can reliably enable the LCD to complete data transmission with the access network device, thereby improving a communication effect of the LCD and improving user experience of the LCD.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 2 is a schematic flowchart of a data transmission method according to an embodiment of the present invention;

FIG. 8 is a schematic flowchart of a data transmission method according to another embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
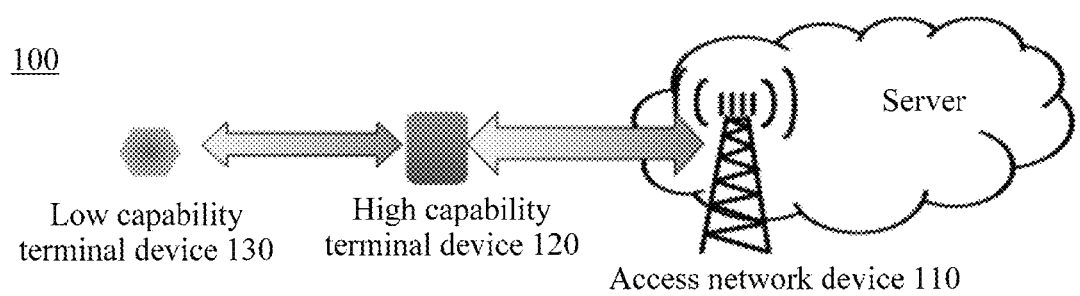
FIG. 1 is a schematic architecture diagram of a data transmission system according to an embodiment of the present invention.

FIG. 1 is a schematic architecture diagram of a data transmission system according to an embodiment of the present invention. As shown in FIG. 1, a data transmission system 100 in the present invention may include an access network device 110, at least one high capability terminal device (HCD) 120 capable of directly accessing the access network device (or capable of directly communicating with the access network device), and at least one low capability terminal device (LCD) 130 incapable of directly accessing the access network device (or incapable of directly communicating with the access network device). A communications system includes the HCD 120 and the access network device 110 may be, for example, a Global System for Mobile Communications (GSM), a Code Division Multiple Access (CDMA) system, a Wideband Code Division Multiple Access (WCDMA) system, a General Packet Radio Service (GPRS) system, or a Long Term Evolution (LTE) system. For ease of understanding and description, LTE is used as an example for description in the following.

The access network device may be, for example, a base transceiver station (BTS) in GSM or CDMA, a NodeB (NodeB) in WCDMA, or an evolved NodeB (eNB or e-NodeB) in LTE, which is not limited in the present invention. For ease of understanding and description, the eNB is used as the access network device for description in the following.

The HCD 120 can directly access the access network device, so as to perform communication with one or more core networks via a radio access network (for example, RAN).

Optionally, the at least one HCD is a mobile terminal device.

Specifically, the HCD 120 may be a mobile terminal, such as a mobile phone (or referred to as a "cellular" phone) and a computer provided with a mobile terminal, for example, a portable, pocket-sized, handheld, computer built-in, or vehicle-mounted mobile apparatus, which exchanges voice and/or data with the radio access network. For ease of understanding and description, LTE UE is used as the HCD 120 for description in the following.

The LCD 130 needs to perform communication with one or more core networks via a radio access network (for example, RAN). However, the LCD 130 cannot directly access the access network device due to, for example, a configuration position, a loss, or a hardware configuration.

Optionally, the at least one LCD is an Internet of Things terminal device.

Specifically, the LCD 130 may be MTC UE, and the MTC UE may be, for example, properly simplified LTE UE; for example, only a single mode, a single band, a single RF chain, or a single antenna mode is performed. In addition, in this embodiment of the present invention, the MTC UE needs to perform transmission of data (for example, data acquired by the MTC UE by using an Internet of Things sensor) with a server by using a communications system such as LTE. Because the MTC UE uses a simplification technology, an access range of an LTE network that the MTC UE can directly access is 5-9 dB or even more less than an access range of user equipment in LTE (hereinafter LTE UE for short). In addition, for example, a smart metering (such as a water meter and an electricity meter) system in the MTC UE is generally deployed in a basement, which leads to an increase of a transmission path loss (about 20 dB); therefore, in comparison with the LTE UE, a 20 dB additional loss is introduced (or rather, the access range decreases by 20 dB). Therefore, the MTC UE cannot directly access the access network device. For ease of understanding and description, the MTC UE is used as the LCD 130 for description in the following.

In this embodiment of the present invention, the HCD 120 in a communication coverage range of the LCD 130 may determine a target communication resource used for communication with the LCD 130, and perform communication with the LCD 130 by using the target communication resource, so as to transmit target data, where the target data may be data that needs to be sent to a server by the LCD 130 via an eNB, or may be acquired by an eNB from a server and delivered to the HCD 120. In this way, data transmission of the LCD 130 can be implemented.

This process is described in detail below.

FIG. 2 shows a schematic flowchart of a data transmission method 200 described from an HCD perspective according to an embodiment of the present invention. As shown in FIG. 2, the method 200 includes:

S210. A first HCD determines a target communication resource in a first time period, where: the target communication resource is different from a downlink system communication resource in a system communication resource; the system communication resource is a resource used to transmit data or signaling between a access network device and the HCD; and the downlink system communication resource is a resource used by the access network device when the access network device transmits data or signaling to the HCD in the first time period.

S220. The first HCD sends first indication information by using a first target communication sub-resource in the target communication resource, where the first indication information is used to indicate that the first HCD is capable of transmitting data for at least one LCD.

S230. The first HCD receives second indication information that is sent by the first LCD by using a second target communication sub-resource in the target communication resource, where the second target communication sub-resource is corresponding to the first target communication sub-resource, and the second indication information is sent by the first LCD according to the first indication information and used to indicate that the first LCD requests to transmit data via the first HCD.

S240. The first HCD determines, from the target communication resource according to the second indication information, a third target communication sub-resource used to transmit data between the first LCD and the first HCD, and sends third indication information to the first LCD by using a fourth target communication sub-resource in the target communication resource, where the third indication information is used to instruct the first LCD to perform data transmission with the first HCD by using the third target communication sub-resource.

S250. The first HCD receives first target data that is sent by the first LCD by using the third target communication sub-resource, and transmits the first target data to the access network device; and/or the first HCD acquires second target data from the access network device, and sends the second target data to the first LCD by using the third target communication sub-resource.

Specifically, in S210, LTE UE#1 (an example of the first HCD) may determine a target communication resource used for communication with MTC UE (an example of the LCD).

Optionally, in this embodiment of the present invention, a time-frequency resource division manner of the target communication resource is the same as a time-frequency resource division manner of the system communication resource, and a data mapping manner of a reference signal carried by the target communication resource is a data mapping manner of a reference signal carried by the downlink system communication resource.

Specifically, in this embodiment of the present invention, a frequency domain configuration manner and a time domain configuration manner of a target communication resource used for communication between an HCD and an LCD may be the same as a frequency domain configuration and a time domain configuration of a target communication resource used for communication between the HCD and an access network device. In addition, a mapping manner, on the target communication resource, of a reference signal transmitted from the LCD to the HCD may be the same as a mapping manner, on a downlink system communication resource, of a reference signal transmitted from the access network device to the HCD. Therefore, the HCD may communicate with the LCD and the access network device by using a same method and hardware device (for example, a transceiver).

When LTE UE is used as the HCD, according to an LTE protocol, a time-frequency resource division manner of a downlink resource from the access network device to the HCD may be as follows: in a frequency domain, multiple subcarriers are included with a spacing of 15 KHz between subcarriers; in a time domain, one subframe may be 1 ms and includes two timeslots of 0.5 ms, and each timeslot includes 7 symbols, where a cyclic prefix (CP) of symbol 0 may be 5.2 µs (160×1 Ts), a length of symbol 0 is 71.875 µs (2048 Ts+160 Ts), a CP length of symbol 1 to symbol 6 is 4.6875 µs (144×1 Ts), and a length of symbol 1 to symbol 6 is 71.354 µs (2048 Ts+144 Ts), where $1T_s=1/(15000\times 2048)$s. One subframe in the time domain and 12 consecutive subcarriers in the frequency domain form one resource block (RB). That a time-frequency resource division manner of the target communication resource is the same as a time-frequency resource division manner of the system communication resource means that the time-frequency resource division manner of the target communication resource is also as follows: in a frequency domain, multiple subcarriers are included with a spacing of 15 KHz between subcarriers; in a time domain, one subframe may be 1 ms and includes two timeslots of 0.5 ms, and each timeslot includes 7 symbols, where a cyclic prefix (CP) of symbol 0 may be 5.2 µs (160×1 Ts), a length of symbol 0 is 71.875 µs (2048 Ts+160 Ts), a CP length of symbol 1 to symbol 6 is 4.6875 µs (144×1 Ts), and a length of symbol 1 to symbol 6 is 71.354 µs (2048 Ts+144 Ts), where $1T_s=1/(15000\times 2048)$ s. One subframe in the time domain and 12 consecutive subcarriers in the frequency domain form one RB.

Figure 3:
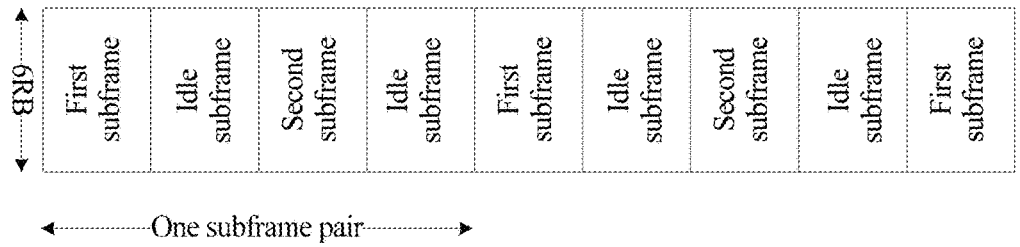
FIG. 3 is a schematic structural diagram of a target communication resource according to an embodiment of the present invention.

In addition, as shown in FIG. 3, a frame format (time-frequency configuration of the target communication resource) of a transmission link between LTE UE and MTC UE may be further designed, so that the transmission link has the following characteristics different from those of a downlink transmission link between the LTE UE and the access network device:

1. A subframe sent from the LTE UE to the MTC UE (hereinafter referred to as an H2L subframe) and a subframe sent from the MTC UE to the LTE UE (hereinafter referred to as an L2H subframe) may be included. That is, the H2L subframe may carry data or signaling sent by the LTE UE to the MTC UE, and the L2H subframe may carry data or signaling sent by the MTC UE to the LTE UE.

2. For a pair of LTE UE and MTC UE in communication, an H2L subframe and an L2H subframe of the LTE UE and the MTC UE may be separated by several preset subframes, where these subframes are referred to as "idle subframes" for the communication pair of LTE UE and MTC UE. The "idle subframes" means that the pair of MTC UE and LTE UE does not transmit data or signaling that is between the MTC UE and the LTE UE by using the idle subframes, so that the LTE UE performs, for example, receive/transmit transition processing or data demodulation and decoding processing with the MTC UE. A quantity of idle subframes (for example, idle subframes 1 shown in FIG. 3) between an H2L subframe and an L2H subframe may be or not be equal to a quantity of idle subframes (for example, idle subframes 2 shown in FIG. 3) between an L2H subframe and an H2L subframe, which is not specifically limited in the present invention. However, the quantity of idle subframes should be greater than or equal to, for example, receive/transmit transition processing time or demodulation and decoding processing time that is required for communication between the MTC UE and the LTE UE. For example, because data processing time does not exceed 3 ms in LTE, a quantity of idle subframes 1 and that of idle subframes 2 may both be three.

One H2L subframe and one closest subsequent L2H subframe form one subframe pair. An idle subframe is set between an H2L subframe and an L2H subframe of a subframe pair, and a quantity of the idle subframes may be preset.

Figure 4:
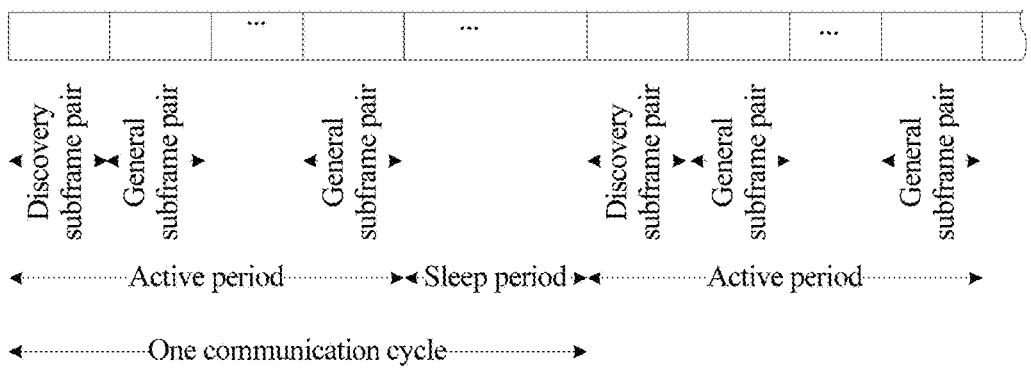
FIG. 4 is another schematic structural diagram of a target communication resource according to an embodiment of the present invention.

Further, as shown in FIG. 4, the frame format (a frame format of the target communication resource) of the transmission link between the LTE UE and the MTC UE may have the following characteristics:

3. The target communication resource may be divided into an active period and a sleep period in terms of time, where the active period includes several subframe pairs. The LTE UE and the MTC UE perform communication in the active period and does not perform communication in the sleep period, so as to reduce power consumption. One active period and one sleep period form one communication cycle. In addition, one active period includes one or more subframe pairs, and one sleep period includes zero, one, or more subframe pairs.

4. At the beginning of a communication cycle, there are one or more specific device discovery subframe pairs with a device discovery function, and then there are one or more general subframe pairs without a device discovery function. The device discovery subframe pair (that is, an example of the first target communication sub-resource and the second target communication sub-resource) may be used for device discovery and access processing between the LTE UE and the MTC UE. The general subframe pair (that is, an example of the third target communication sub-resource and the fourth target communication sub-resource) may be used for signaling and data transmission after access. The foregoing process is described in detail subsequently.

In addition, in this embodiment of the present invention, a mapping manner, on the target communication resource, of a reference signal sent by the MTC UE to the LTE UE may be one of reference mapping manners on the downlink system communication resource. That is, multiple types of reference signals may be used in communication between the LTE UE and the access network device, and mapping manners of all the reference signals may be different from each other. In this embodiment of the present invention, a mapping manner of a reference signal sent by the MTC UE to the LTE UE may be made the same as a transmission manner of any reference signal transmitted between the LTE UE and the access network device. For example, the mapping manner, on the target communication resource, of the reference signal sent by the MTC UE to the LTE UE may be the same as a mapping manner, on an LTE downlink transmission time-frequency resource, of a common reference signal (CRS, Common Reference Signal) in LTE downlink transmission, so that when receiving a signal sent by the MTC UE to the LTE UE, the LTE UE uses a channel estimation manner the same as that used when the LTE UE receives a downlink signal of the access network device.

According to the data transmission method in this embodiment of the present invention, a time-frequency resource manner of a target communication resource is made the same as that of a system communication resource, and a mapping manner of a reference signal in a signal sent by an LCD to an HCD is a mapping manner of a reference signal in a signal sent by an access network device to the HCD, which can enable the HCD to use a same method and hardware device or similar methods and hardware devices (for example, a transceiver, channel estimation, or demodulation) to communicate with the LCD and the access network device, thereby reducing a cost of the HCD. In addition, the HCD proposed in this embodiment of the present invention forwards communication information between the LCD and the access network device, which improves signal quality of communication between the LCD and the access network, thereby improving communication efficiency between the LCD and the access network.

It should be understood that, the configuration (or division manner) of the target communication resource and the resource mapping manner that are listed above are merely exemplary descriptions, and the present invention is not limited thereto. All other time domain or frequency domain configuration manners and resource mapping manners that can be used for communication between two devices fall within the protection scope of the present invention. For example, configuration of the target communication resource may be determined according to a communications system formed by the HCD and the access network device, or a time domain or frequency domain resource configuration manner different from that in the prior art may be defined. A resource mapping manner different from that in the prior art may also be defined.

In addition, in this embodiment of the present invention, to reduce interference to user equipment (for ease of differentiation, hereinafter referred to as system UE) communicating with the access network device, when determining the target communication resource, the HCD may determine a resource different from a system resource (that is, a resource used in a system formed by the system UE and the access network device) or an idle resource (that is, a system resource unused in the first time period) in the system resource as the target communication resource. In a manner of determining the target communication resource, the HCD may detect and sense an idle resource other than a downlink transmission resource currently used in a system (for example, an LTE system).

According to the data transmission method in this embodiment of the present invention, a target communication resource used for communication between an HCD and an LCD is made different from a system communication resource used by an access network device when performing communication, which can avoid interference to another user equipment communicating with the access network device, thereby improving practicability of the data transmission method in the present invention.

Optionally, in this embodiment of the present invention, bandwidth of the target communication resource is less than or equal to bandwidth of the system communication resource.

Specifically, because an amount of data that an MTC device needs to transmit is small, bandwidth required by the MTC device is small. Therefore, the bandwidth of the target communication resource may be made less than the bandwidth of the system communication resource used by the access network device. For example, a part of bandwidth resources may be selected from idle resources of the system communication resource. For example, bandwidth of the system communication resource is 20 MHz, and a part of bandwidth resources may be selected from idle resources of the system communication resource, for example, a bandwidth of 1.08 M may be used as the target communication resource.

According to the data transmission method in this embodiment of the present invention, on a premise that communication of the MTC device is ensured, resource utilization can be effectively improved by reducing the bandwidth of the target communication resource.

After the target communication resource is determined as described above, in S220, the LTE UE#1 may send a discovery signal (an example of the first indication information) to the MTC UE by using a first discovery subframe (an example of the first target communication sub-resource) of a discovery subframe pair.

Optionally, the first indication information is carried in a first synchronization signal; the first synchronization signal includes a first primary synchronization signal and a first secondary synchronization signal; a transmission relationship in a time domain between the first primary synchronization signal and the first secondary synchronization signal is different from a transmission relationship in a time domain between a second primary synchronization signal and a second secondary synchronization signal; the second primary synchronization signal and the second secondary synchronization signal are second synchronization signals; and the second synchronization signal is used to carry fifth indication information sent by the access network device, where the fifth indication information is used to indicate that the access network device is capable of transmitting data for the at least one HCD.

Figure 5A:
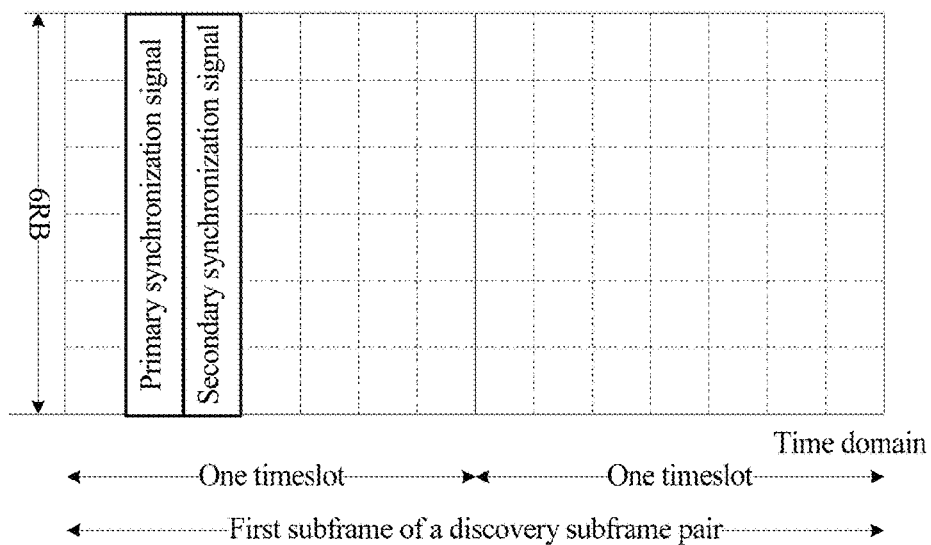
FIG. 5a is a schematic structural diagram of a first target communication sub-resource according to an embodiment of the present invention.

Specifically, as shown in FIG. 5a, in this embodiment of the present invention, the discovery signal may be transmitted in an H2L discovery subframe of the discovery subframe pair and includes a primary synchronization signal (for ease of differentiation, hereinafter referred to as a first primary synchronization signal) and a secondary synchronization signal (for ease of differentiation, hereinafter referred to as a first secondary synchronization signal), where the first primary synchronization signal and the first secondary synchronization signal each occupy one symbol. Information carried by the first primary synchronization signal and the first secondary synchronization signal and a method for generating and sending the first primary synchronization signal and the first secondary synchronization signal may be the same as information carried by a primary synchronization signal (for ease of differentiation, hereinafter referred to as a second primary synchronization signal) and a secondary synchronization signal (for ease of differentiation, hereinafter referred to as a second secondary synchronization signal) that are used by an access network device (for example, an eNB) accessed by the HCD (for example, the LTE UE#1) and a method for generating and sending the primary synchronization signal and the secondary synchronization signal, and description thereof is omitted herein to avoid redundancy. In addition, a relationship between a symbol carrying the first primary synchronization signal (which may also be referred to as a primary synchronization channel) and a symbol carrying the first secondary synchronization signal (which may also be referred to as a secondary synchronization channel) may be different from a relationship between a symbol carrying the second primary synchronization signal and a symbol carrying the second secondary synchronization signal in LTE, so as to prevent another LTE UE from accessing the HCD (for example, the LTE UE#1). Specifically, in LTE, the symbol carrying the second secondary synchronization signal is a symbol that is immediately prior to the symbol carrying the second primary synchronization signal. In contrast, in this embodiment of the present invention, for a link between the HCD and the LCD, the symbol carrying the first primary synchronization signal may be prior to (immediately prior to or separated by one or more symbols from) the symbol carrying the first secondary synchronization signal.

According to the data transmission method in this embodiment of the present invention, information carried by a discovery signal in a link between an HCD and an LCD and a manner of generating the discovery signal are made the same as information carried by a synchronization signal used by an access network device accessed by the HCD and a manner of generating the synchronization signal, which may enable the HCD to multiplex, when transmitting the discovery signal, a circuit used by the HCD to receive the synchronization signal of the access network device, thereby reducing a cost of the HCD. In addition, a configuration of the discovery signal in the link between the HCD and the LCD is made different from a configuration of a discovery signal used by the access network device, which can prevent another user equipment communicating with the access network device from incorrectly accessing the HCD, thereby improving practicability of the data transmission method in the present invention.

Figure 5B:
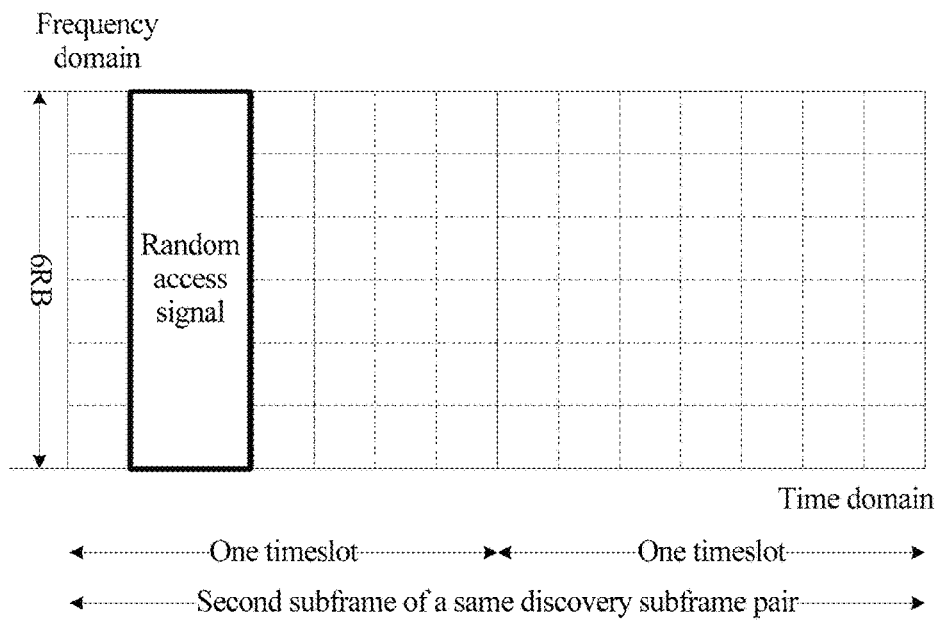
FIG. 5b is a schematic structural diagram of a second target communication sub-resource according to an embodiment of the present invention.

Therefore, after detecting the discovery signal, MTC UE#1 (an example of the first LCD) may determine that the MTC UE#1 can perform data transmission with an eNB via the LTE UE#1 (an example of the first HCD), and may send a random access signal (an example of the second indication information) to the LTE UE#1, so as to perform access processing for the LTE UE#1. As shown in FIG. 5b, the MTC UE#1 may transmit the random access signal in an L2H subframe, specifically, in a physical random access channel (an example of the second target communication sub-resource) in the L2H subframe of the same discovery subframe pair (which is the same as the discovery subframe pair used by the LTE UE#1 to send the discovery signal in S220). In addition, the random access signal may use a format of an LTE uplink random access format 4, and occupy two consecutive symbols of the L2H subframe in terms of time; for example, the random access signal is in the second symbol and the third symbol of the L2H subframe.

In this embodiment of the present invention, the random access signal needs to carry identification information corresponding to the MTC UE#1, so that the LTE UE#1 confirms the MTC UE#1. Herein, the MTC UE#1 may randomly select one preamble from multiple random access sequences (preamble) as the identification information corresponding to the MTC UE#1.

In addition, a random access sequence (preamble) provided for selection of the MTC UE#1 may be determined according to a physical cell identifier (PCI, Physical Cell ID) of an eNB accessed by the LTE UE#1. The MTC UE#1 receives a device discovery signal of the LTE UE#1, from which the MTC UE#1 obtains a physical cell identifier of an access network device (for example, an eNB) accessed by the LTE UE#1. Generally, a quantity of Preambles (that is, a quantity of random access Preambles of one LTE cell) is no more than 64.

In addition, a quantity of preambles provided for selection of the MTC UE#1 may close to a maximum quantity of MTC UEs#1 served by each LTE UE#1; for example, if one HCD can transmit data for 15 LCDs at most, the quantity of preambles may be made 14. In this case, two Frank/Zadoff-Chu (FZC, Frank/Zadoff-Chu) sequences with different root sequences may be selected, and each root sequence has 7 different cyclic shifts (CS, cyclic shift) in total, where one root sequence is floor($n_{PCI}/7$), and the other root sequence is floor($n_{PCI}/7$)+1. Each initially accessed LCD may randomly select a CS and a root sequence. Multiple random access Preambles are numbered according to a preset rule, and a numbering manner may use a numbering manner the same as that of the LTE uplink random access format 4. A number of a Preamble selected by an LCD is determined by a CS and a root sequence that are selected by the LCD.

In S230, the LTE UE#1 receives the random access signal by using a physical random access channel (PRACH, Physical Random Access Channel), so as to acquire a CS and a root sequence that are selected by the MTC UE#1, and determines the MTC UE#1 according to the CS and the root sequence. Therefore, the LTE UE#1 may perform access processing for the MTC UE#1. For example, the LTE UE#1 may request an Internet Protocol (IP, Internet Protocol) address for the MTC UE#1 (for example, from an eNB).

It should be noted that, in this embodiment of the present invention, the LTE UE#1 may simultaneously serve multiple MTC UEs; therefore, the LTE UE#1 may allocate a unique link identifier (LID, link ID) to each pair of transmission links (including an uplink and a downlink) between the LTE UE#1 and one or more MTC UEs accessing the LTE UE#1 (including the MTC UE#1).

Optionally, the LTE UE#1 may further set one or more links with a special LID (for example, all zeros), where the link is used to send a broadcast signal to all MTC UEs accessing the LTE UE#1.

In this embodiment of the present invention, the LID may be expressed by using M bits, where M=ceil(log 2(max (number of link)+1)), max (number of link) represents a maximum quantity of links supported by the LTE UE#1, and a value of the max (number of link) may be pre-stipulated. For example, it may be stipulated that one HCD supports 15 LCDs at most, and therefore, the LID may be expressed by 4 bits.

In addition, the LTE UE#1 may send a random access response signal to the MTC UE#1, where the random access response signal carries an LID allocated to a link of the MTC UE#1. The random access response signal sent by the LTE UE#1 includes a sequence number of a Preamble of the random access signal of the MTC UE#1 received by the LTE UE#1, and the MTC UE#1 determines, according to this information, that the random access response signal is a random access response signal sent to the MTC UE#1.

The MTC UE#1 may determine, according to the random access response signal, the LID allocated to the MTC UE#1 by the LTE UE#1.

It should be noted that, if the MTC UE#1 does not receive the random access response signal in an H2L subframe after an L2H subframe carrying the random access signal, the MTC UE#1 may consider that previous random access fails, and may re-send a random access signal in an L2H subframe of a subsequent discovery subframe pair until a random access response signal is successfully received or a maximum quantity of times of retransmission is reached.

It should be understood that, access processing listed above is merely exemplary description. In this embodiment of the present invention, access processing performed by an LCD for an HCD may be similar to access processing performed by UE for an access network device. In addition, access processing performed by the HCD for the LCD may be similar to access processing performed by the access network device for the UE, and description thereof is omitted herein to avoid redundancy.

In addition, the communication process described above in which the MTC UE#1 accesses the LTE UE#1 may also be referred to as contention transmission. The LTE UE#1 does not allocate a dedicated communication resource to the MTC UE#1. That is, two symbols that are in an L2H subframe of each discovery subframe pair and carry a random access signal are not exclusively occupied by the MTC UE#1.

In S240, the LTE UE#1 performs resource scheduling for the MTC UE#1. Specifically, the LTE UE#1 may allocate, to the MTC UE#1, a communication resource (which is specially used to transmit signaling and data between the LTE UE#1 and the MTC UE#1 and hereinafter referred to as a communication resource A) used for scheduling transmission.

In this embodiment of the present invention, the communication resource A may include a communication resource B (an example of a fourth sub-target communication resource) used to transmit physical layer control signaling and/or a communication resource C (an example of a third sub-target communication resource) used to transmit higher layer signaling and data.

The communication resource B may include, for example, a channel used to transmit a reference signal (RS, Reference Signal), a physical HARQ indicator channel (PHICH, Physical HARQ Indicator Channel), a physical schedule request channel (PSRCH, Physical Schedule Request Channel), and a physical resource grant channel (PRGCH, Physical Resource Grant Channel). The LTE UE#1 may allocate, to the MTC UE#1 according to a pre-defined rule, the communication resource B used to transmit physical layer control information. In addition, in this embodiment of the present invention, the LTE UE#1 may determine the communication resource C according to the same rule.

Figure 6A:
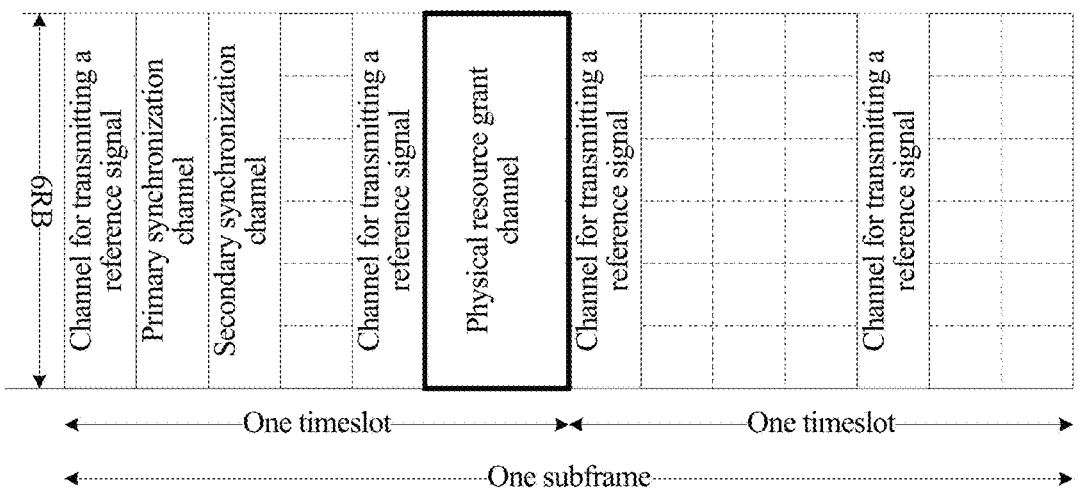
FIG. 6a is a schematic structural diagram of a fourth target communication sub-resource according to an embodiment of the present invention.
Figure 6B:
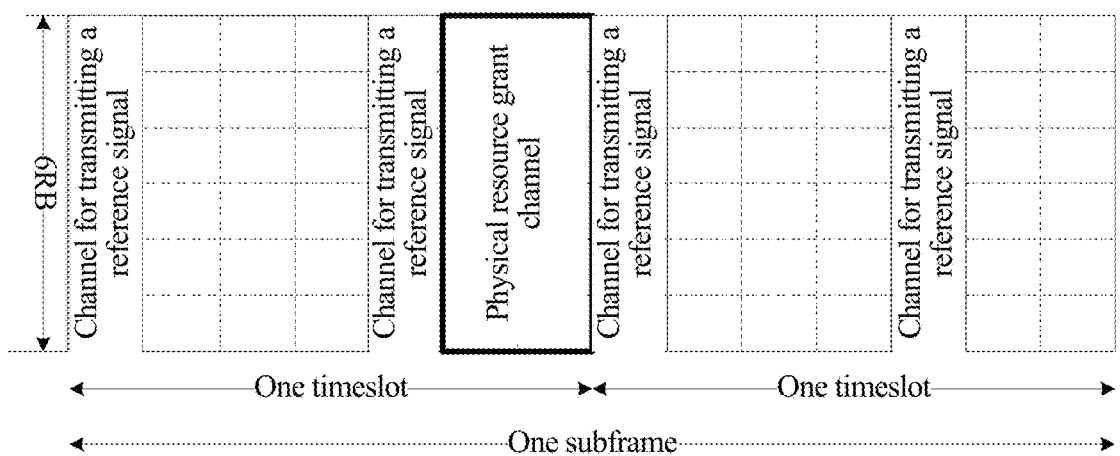
FIG. 6b is a schematic structural diagram of a fourth target communication sub-resource according to another embodiment of the present invention.

A rule of determining a communication resource transmitting an RS, for example, as shown in FIG. 6a and FIG. 6b, may be the same as a rule of determining a communication resource for a common reference signal in a transmission mode 1 of (LTE) an access network device; that is, the reference signal is transmitted in symbol #0 and symbol #4 of each timeslot. In a frequency domain, a reference signal transmitted in symbol #0 is carried in a subcarrier #0 and subcarrier #6 of an RB, and a reference signal transmitted in symbol #4 is carried in a subcarrier #4 and subcarrier #10 of an RB.

In a rule of determining a PRGCH, for example, as shown in FIG. 6a and FIG. 6b, the physical resource grant channel may be enabled to perform transmission in an H2L subframe, and the PRGCH occupies two consecutive symbols that are in the H2L subframe and do not include a reference signal RS. For example, in a discovery subframe pair, a primary synchronization channel and a secondary synchronization channel occupy symbol #1 and symbol #2 of timeslot 0 of an H2L subframe, and the PRGCH occupies symbol #5 and symbol #6 of timeslot 0; in an H2L subframe of a non-discovery subframe pair, the PRGCH occupies symbol #5 and symbol #6 of timeslot 0.

Figure 7:
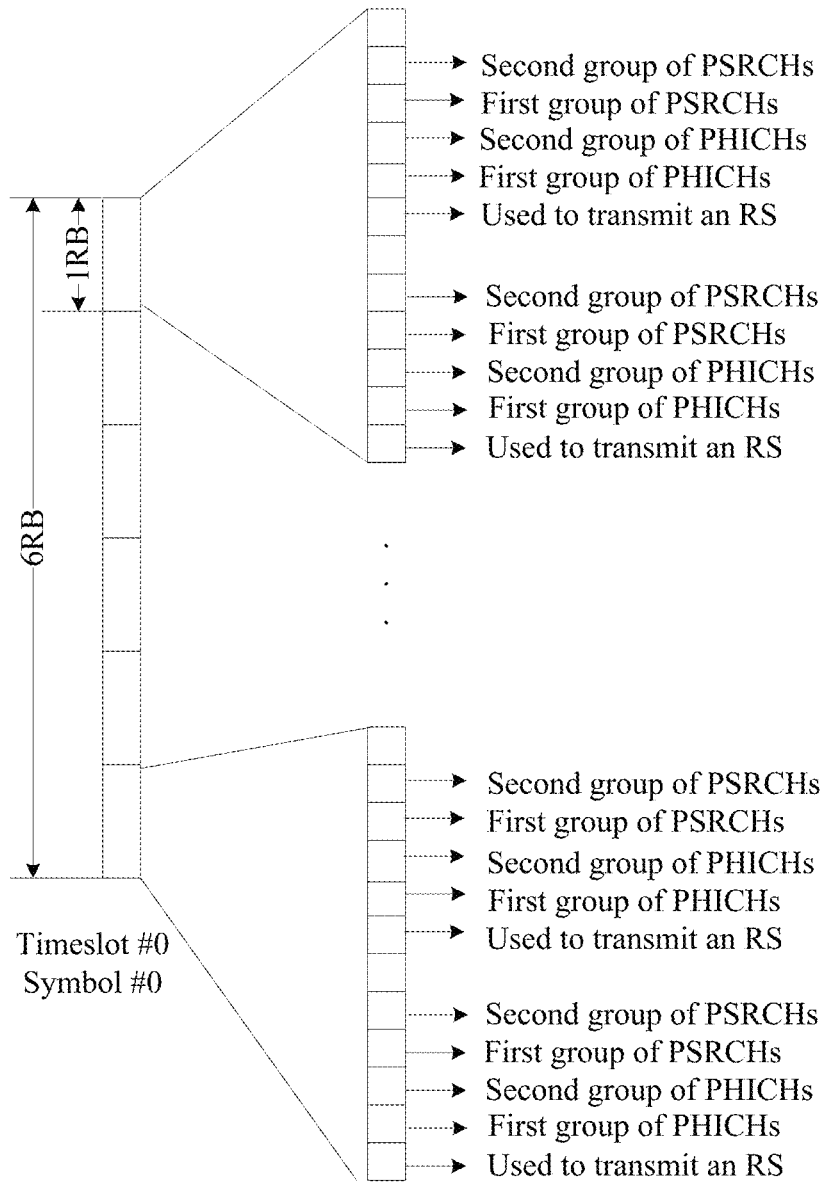
FIG. 7 is a schematic structural diagram of a fourth target communication sub-resource according to still another embodiment of the present invention.

In a rule of determining a PHICH from the LTE UE#1 (HCD) to MTC UE (LCD), for example, eight PHICHs may be put into one group, where each group of PHICHs maps to a same physical resource. In this embodiment of the present invention, one resource block (1RB) may include 12 resource elements (RE, Resource Element), where one RE is equivalent to one transmission resource, and corresponds to one symbol in a time domain and one subcarrier in a frequency domain. Therefore, each group of PHICHs may be mapped to 12 REs, and the 12 REs may be evenly distributed in transmission bandwidth (6×12 subcarriers). For example, the 12 REs may be evenly distributed in an RE that is on symbol 0 of timeslot 0 of each subframe of a subframe pair and does not carry a reference signal. Specifically, as shown in FIG. 7, for example, REs corresponding to a first group of PHICHs are the number #1 subcarrier and number #7 subcarrier of each RB of symbol 0 of timeslot 0, and REs corresponding to a second group of PHICHs are the number #2 subcarrier and number #8 subcarrier of each RB of symbol 0 of timeslot 0. In addition, if there is a relatively large quantity of PHICH groups, another symbol may be pre-defined. For example, an RE that is on symbol 1 of timeslot 0 and does not carry a reference signal may also be used to transmit a PHICH group.

Similarly, in a rule of determining a PHICH from MTC UE (LCD) to the LTE UE#1 (HCD), eight PHICHs may be put into one group, where each group of PHICHs maps to a same physical resource. For example, a group of PHICHs may be mapped to 12 REs, and the 12 REs may be evenly distributed in transmission bandwidth (6×12 subcarriers). For example, the 12 REs may be evenly distributed in an RE that is on symbol 0 of timeslot 0 of each subframe of a subframe pair and does not carry a reference signal. Specifically, as shown in FIG. 7, for example, 12 REs of a first group of PHICHs may be corresponding to the number #1 subcarrier and number #7 subcarrier of each RB of symbol 0 of timeslot 0, and 12 REs of a second group of PHICHs may be corresponding to the number #2 subcarrier and number #8 subcarrier of each RB of symbol 0 of timeslot 0. If there is a relatively large quantity of PHICH groups, another symbol may be pre-defined. For example, an RE that is on symbol 1 of timeslot 0 and does not carry a reference signal may also be used to transmit a PHICH group.

In a rule of determining a PSRCH from MTC UE (LCD) to the LTE UE#1 (HCD), eight PSRCHs may be put into one group, and each group of PSRCHs maps to a same physical resource. For example, one group of PRSCHs may be mapped to 12 REs, and the 12 REs may be evenly distributed in transmission bandwidth (6×12 subcarriers). For example, the 12 REs may be evenly distributed in an RE that is on symbol 0 of timeslot 0 of each subframe of a subframe pair and does not carry a reference signal or a PHICH. Specifically, for example, as shown in FIG. 7, 12 REs of a first group of PRSCHs may be the number #3 subcarrier and number #9 subcarrier of each RB of symbol 0 of timeslot 0 in the transmission bandwidth, and 12 REs of a second group of PRSCHs may be the number #4 subcarrier and number #10 subcarrier of each RB of symbol 0 of timeslot 0.

In addition, the LTE UE#1 may allocate a downlink (from LTE UE to MTC UE) transmission resource (the communication resource C) and an uplink (from MTC UE to LTE UE) transmission resource (the communication resource C) to a transmission link between the LTE UE#1 and one or more MTC UEs (including the MTC UE#1) accessing the LTE UE#1, and transmit, by using the foregoing communication resource B, a resource allocation message indicating the communication resource C to each MTC UE.

The resource allocation message is differentiated by using the foregoing LID. As an example instead of a limitation, a type of resource allocation message may include an LID and resource allocation information. The resource allocation information may be used to indicate a frequency domain resource allocated to the link. In addition, in terms of a time domain resource, it may be stipulated that for a downlink, the time domain resource is a current H2L subframe; for an uplink, the time domain resource is an L2H subframe of a same subframe pair. It should be understood that, the content indicated by the resource allocation information listed above is merely exemplary description, which is not limited thereto in the present invention. All other manners that can enable the MTC UE to confirm a time-frequency resource allocated to the MTC UE by the LTE UE fall within the protection scope of the present invention. For example, the resource allocation information may not only indicate a frequency domain resource allocated to the link, but also may indicate a time domain resource allocated to the link.

In addition, the resource allocation information may be indicated in a bitmap (bitmap) manner. That is, a bit is allocated to each RB, so as to indicate whether to allocate the RB to the link.

Optionally, the resource allocation message may further carry a new data identifier, where the new data identifier may be used for a hybrid automatic repeat request (HARQ, Hybrid Automatic Repeat Request), so as to indicate whether data carried by the resource is initial transmission data or retransmission data.

Specifically, in this embodiment of the present invention, a transmission link between LTE UE and MTC UE may use a synchronous physical layer automatic feedback retransmission mechanism. The LTE UE sends data or signaling in an H2L subframe of a subframe pair, and after receiving the H2L subframe, the MTC UE sends acknowledgment (ACK)/non-acknowledgment (NACK) information in an L2H subframe (specifically, in a PHICH of the L2H subframe) of the same subframe pair. Alternatively, the MTC UE sends data or signaling in an L2H subframe of a subframe pair, and after receiving the L2H subframe, the LTE UE transmits ACK/NACK information in an H2L subframe (specifically, in a PHICH of the H2L subframe) of a subsequent subframe pair. ACK/NACK information of an H2L subframe is carried in a PHICH of an H2L subframe of a subframe pair, and ACK/NACK information of an L2H subframe is carried in a PHICH of an L2H subframe of a subframe pair.

Optionally, to simplify signaling design and reduce receiving complexity in this embodiment of the present invention, it may be stipulated that there is only one HARQ process in an uplink or a downlink; that is, when retransmission processing needs to be performed, same data is retransmitted only once.

In an embodiment of a transmission manner of the foregoing ACK/NACK information, binary phase shift keying (BPSK, Binary Phase Shift Keying) modulation may be performed on ACK/NACK information of each data packet; spread spectrum is performed on a modulated signal by a spreading factor, for example, 4; and repetition is performed on spread spectrum information for 3 times, thereby obtaining 12 data symbols after the spread spectrum and the repetition, and then the 12 symbols are mapped to a PHICH. A spread spectrum sequence number $n_{PHICH}^{seq}$ used by each link and a PHICH transmission resource group $n_{PHICH}^{group}$ to which each link is mapped may be uniquely determined by using an LID. For example, it may be stipulated that $n_{PHICH}^{seq}=\text{LinkID} \bmod 8$ and $$n_{PHICH}^{group} = \left\lfloor \frac{LinkID}{8} \right\rfloor,$$

where a correspondence between the spread spectrum sequence number and a spread spectrum sequence is the same as a correspondence in LTE.

In addition, in this embodiment of the present invention, the LTE UE may set multiple PHICH transmission groups, and each PHICH transmission group may be used to perform retransmission processing on one or more MTC UEs. Each PHICH transmission group includes 12 resource elements (RE, Resource Element), and different PHICH transmission groups correspond to different REs. Specifically, in a time domain, a PHICH transmission group is corresponding to a symbol pre-agreed on a transmission link, such as the first symbol, for example, symbol #0 of a timeslot #0; in a frequency domain, a PHICH transmission group may be evenly distributed in entire transmission bandwidth, for example, on 6 RBs.

In this embodiment of the present invention, a size of the resource allocation message may be a fixed value. If an size of an actual resource allocation message is less than the fixed value, any bit may be used to fill a remaining part.

In addition, a cyclic redundancy check code (CRC, Cyclic Redundancy Check) is used to check the resource allocation message, and the resource allocation message uses a modulation manner and a coding manner on which the MTC UE and the LTE UE may pre-agree by means of negotiation; for example, may use a 16-bit CRC check, and use quadrature phase shift keying (QPSK, Quadrature Phase Shift Keying) modulation and ⅓ rate tail-biting convolutional coding.

In this embodiment of the present invention, the resource allocation message may be transmitted to the MTC UE by using a PRGCH. The HCD and the LCD may pre-agree, by means of negotiation, on a time-frequency resource occupied by the PRGCH. For example, when the PRGCH occupies a two-symbol time-frequency resource, an agreement manner may be that the PRGCH occupies two consecutive symbols that do not include a reference signal RS. For example, as shown in FIG. 6a, in an H2L subframe of the foregoing general subframe pair, a first primary synchronization channel and a first secondary synchronization channel occupy symbol #1 and symbol #2 of timeslot 0, and the PRGCH occupies symbol #5 and symbol #6 of timeslot 0. As shown in FIG. 6b, in an H2L subframe of in a general subframe pair (which is specifically a subframe from LTE UE to MTC UE), the PRGCH occupies symbol #5 and symbol #6 of timeslot 0.

In S250, the MTC UE#1 and the LTE UE#1 may perform data transmission by using the allocated communication resource C described above.

For example, when the MTC UE#1 needs to transmit data (that is, uplink data) to the access network device via the LTE UE#1, the MTC UE#1 may send scheduling request information to the LTE UE#1 by using a PSRCH. In this embodiment of the present invention, it may be stipulated that, that a value of the scheduling request information is 1 means that scheduling a resource needs to be requested; and that the value of the scheduling request information is 0 means that there is no uplink data recently. A mapping manner, on a PRSCH, of the scheduling request information may be similar to a mapping manner, on a PHICH, of the ACK/NACK information. That is, BPSK modulation may be performed on each piece of scheduling request information; spread spectrum is performed on a modulated signal by a spreading factor, for example, 4; and repetition is performed on spread spectrum information for 3 times, thereby obtaining 12 data symbols after the spread spectrum and the repetition, and then the 12 symbols are mapped to a PSRCH. A spread spectrum sequence number $n_{PSRCH}^{seq}$ used by each link and a PSRCH transmission resource group $n_{PSRCH}^{group}$ to which each link is mapped may be uniquely determined by using an LID. For example, it may be stipulated that $n_{PSRCH}^{seq}$=LinkID mod 8 and $$n_{PSRCH}^{group} = \left\lfloor \frac{LinkID}{8} \right\rfloor,$$

where a correspondence between the spread spectrum sequence number and a spread spectrum sequence is the same as a correspondence in LTE.

In addition, in this embodiment of the present invention, the LTE UE may set multiple PSRCH transmission groups, and each PSRCH transmission group may be used to schedule one or more MTC UEs. Each PSRCH transmission group includes 12 resource elements (RE, Resource Element), and different PSRCH transmission groups correspond to different REs. Specifically, in a time domain, a PSRCH transmission group is corresponding to a symbol pre-agreed on a transmission link, such as the first symbol, for example, symbol #0 of a timeslot #0; in a frequency domain, a PSRCH transmission group may be evenly distributed in another remaining symbol in entire transmission bandwidth (for example, 6 RBs) except a symbol carrying a reference signal and a PHICH.

After receiving the scheduling request information, the LTE UE#1 may perform resource scheduling, for example, determine, from the foregoing communication resource C, a communication resource D (another example of the third sub-target communication resource) used to transmit uplink data, and sends information (an example of the third indication information) indicating the communication resource D to the MTC UE#1 by using, for example, a PSRCH (another example of a fourth sub-target communication resource).

Therefore, the MTC UE#1 may map the data to the communication resource D according to a transmission mode 1 of a PDSCH in LTE, and sends the mapped data to the LTE UE#1.

The LTE UE#1 may acquire the data from the communication resource D according to the transmission mode 1 of the PDSCH in LTE, and sends the data to a server.

For another example, if receiving downlink data that is from a server and needs to be transmitted to the LTE UE#1, the LTE UE#1 may perform resource scheduling. The LTE UE#1 determines, from the foregoing communication resource C, a communication resource E (still another example of the third sub-target communication resource) used to transmit downlink data, and sends information (another example of the third indication information) indicating the communication resource E to the MTC UE#1 by using, for example, a PSRCH (an example of a fourth sub-target communication resource). In addition, in S250, the downlink data is mapped to the communication resource E and transmitted to the MTC UE#1.

The LTE UE#1 may acquire the third indication information from the PSRCH, and therefore may acquire the downlink data from the communication resource E according to the third indication information.

Optionally, before the first HCD receives the first target data that is sent by the first LCD by using the third target communication sub-resource, the method further includes:

detecting, by the first HCD, a system signal, where the system signal is a signal used to carry data or signaling transmitted between the HCD and the access network device;

determining, by the first HCD, target transmission power according to strength of the system signal; and sending, by the first HCD to the first LCD by using a fifth target communication sub-resource in the target communication resource, fourth indication information used to indicate the target transmission power, so as to instruct the first LCD to send the first target data according to the target transmission power by using the third target communication sub-resource.

Specifically, to avoid interference to another LTE UE in this embodiment of the present invention, the LTE UE#1 may detect a signal transmitted between the access network device and the another LTE UE, and determine, according to strength of the signal, maximum transmission power used to transmit the foregoing uplink data or downlink data. The maximum transmission power may be set to maximum transmit power that does not interfere with LTE cellular communication, which may be set by a cellular base station/cell accessed by the LTE UE#1, or may be calculated by the LTE UE#1 itself, or may be set to fixed maximum transmit power, for example, 0 dBm.

In addition, the LTE UE#1 may determine, according to the following formula, transmission power (that is, target transmission power) used to transmit MTC UE#1 data or data that is from the LTE UE#1 to the MTC UE#1, and target transmission power of the MTC UE#1 is used as an example:

$$P_{L2H}(i) = \min \begin{cases} P_{CMAX}(i) \\ 10 \log_{10}(M_{L2H}(i)) + P_o + \alpha \cdot PL_{L2H} + f(i) \end{cases}$$

i indicates a serial number of a measured subframe; $P_{CMAX}(i)$ indicates maximum transmission power of the MTC UE#1 in a subframe i; M(i) indicates transmission bandwidth of the MTC UE#1; $P_o$ is a power control adjustment value; $\alpha$ is used to determine a ratio of open loop power control to a power setting; PL indicates a path loss from the LTE UE#1 to the MTC UE#1; f(i) indicates an accumulated closed-loop power control volume of the $i^{th}$ subframe.

Therefore, in transmission of the data that is from the LTE UE#1 to the MTC UE#1, the LTE UE#1 sends, according to the target transmission power, data that is from the LTE UE#1 to the MTC UE#1.

Optionally, the sending the second target data to the first LCD by using the third target communication sub-resource includes:

detecting, by the first HCD, a system signal, where the system signal is a signal used to carry data or signaling transmitted between the HCD and the access network device;

determining, by the first HCD, target transmission power according to strength of the system signal; and sending, by the first HCD, the second target data to the first LCD according to the target transmission power by using the third target communication sub-resource.

Specifically, in transmission of uplink data, the LTE UE#1 may send, to the MTC UE#1, information (hereinafter referred to as power indication information) used to indicate the target transmission power P(i) determined above or an increase/decrease of the target transmission power.

Therefore, the MTC UE#1 may send the uplink data according to the target transmission power.

In this embodiment of the present invention, the power indication information may be carried in a resource allocation message.

According to the data transmission method in this embodiment of the present invention, the target transmission power is determined according to strength of a system signal, so that transmission power used for communication between an HCD and an LCD decreases, which can reduce interference to another user equipment communicating with an access network device, thereby improving practicability of the data transmission method in the present invention.

In addition, in this embodiment of the present invention, because a communication distance between MTC UE and LTE UE is short, a transmission delay may fall within a CP range; therefore, transmission timing on an MTC UE side may be the same as transmission timing on an LTE UE side.

According to the data transmission method in this embodiment of the present invention, an HCD determines a communication resource used for data transmission with an LCD, and performs, with the LCD by using the communication resource, transmission of data that needs to be sent to an access network device or data acquired from the access network device, which can reliably enable the LCD to complete data transmission with the access network device, thereby improving a communication effect of the LCD and improving user experience of the LCD.

FIG. 8 shows a schematic flowchart of a data transmission method 300 described from an LCD perspective according to an embodiment of the present invention. As shown in FIG. 8, the method 300 includes:

S310. A first LCD detects, in a first time period, first indication information that is sent by a first HCD by using a first target communication sub-resource in a target communication resource, where: the first indication information is used to indicate that the first HCD is capable of transmitting data for at least one LCD; the target communication resource is determined by the first HCD, and the target communication resource is different from a downlink system communication resource in a system communication resource; the system communication resource is a resource used to transmit data or signaling between access network device and the HCD; and the downlink system communication resource is a resource used by the access network device when the access network device transmits data or signaling to the HCD in the first time period.

S320. The first LCD sends second indication information to the first HCD according to the first indication information by using a second target communication sub-resource in the target communication resource, where the second target communication sub-resource is corresponding to the first target communication sub-resource, and the second indication information is used to indicate that the first LCD requests to transmit data via the first HCD.

S330. The first LCD receives third indication information that is sent by the first HCD and used to indicate a third target communication sub-resource, and determines the third target communication sub-resource according to the third indication information, where the third target communication sub-resource is determined by the first HCD from the target communication resource and used to transmit data between the first LCD and the first HCD, and the third indication information is sent by the first HCD according to the second indication information by using a fourth target communication sub-resource in the target communication resource.

S340. The first LCD sends first target data to the first HCD by using the third target communication sub-resource, so that the first HCD transmits the first target data to the access network device; and/or the first LCD receives second target data sent by the first HCD by using the third target communication sub-resource, where the second target data is acquired by the first HCD from the access network device.

Specifically, LTE UE#1 (an example of the first HCD) may determine a target communication resource used for communication with MTC UE (an example of the LCD).

Optionally, a time-frequency resource division manner of the target communication resource is the same as a time-frequency resource division manner of the system communication resource, and a data mapping manner of a reference signal carried by the target communication resource is a data mapping manner of a reference signal carried by the downlink system communication resource.

Specifically, in this embodiment of the present invention, a frequency domain configuration manner and a time domain configuration manner of a target communication resource used for communication between an HCD and an LCD may be the same as a frequency domain configuration and a time domain configuration of a target communication resource used for communication between the HCD and an access network device. In addition, a mapping manner, on the target communication resource, of a reference signal transmitted from the LCD to the HCD may be the same as a mapping manner, on a downlink system communication resource, of a reference signal transmitted from the access network device to the HCD. Therefore, the HCD may communicate with the LCD and the access network device by using a same method and hardware device (for example, a transceiver).

When LTE UE is used as the HCD, according to an LTE protocol, a time-frequency resource division manner of a downlink resource from the access network device to the HCD may be as follows: in a frequency domain, multiple subcarriers are included with a spacing of 15 KHz between subcarriers; in a time domain, one subframe may be 1 ms and includes two timeslots of 0.5 ms, and each timeslot includes 7 symbols, where a cyclic prefix (CP, cyclic prefix) of symbol 0 may be 5.2 μs (160×1 Ts), a length of symbol 0 is 71.875 μs (2048 Ts+160 Ts), a CP length of symbol 1 to symbol 6 is 4.6875 μs (144×1 Ts), and a length of symbol 1 to symbol 6 is 71.354 μs (2048 Ts+144 Ts), where 1 $T_s=1/(15000×2048)$s. One subframe in the time domain and 12 consecutive subcarriers in the frequency domain form one resource block (RB, Resource Block). That a time-frequency resource division manner of the target communication resource is the same as a time-frequency resource division manner of the system communication resource means that the time-frequency resource division manner of the target communication is also as follows: in a frequency domain, multiple subcarriers are included with a spacing of 15 KHz between subcarriers; in a time domain, one subframe may be 1 ms and includes two timeslots of 0.5 ms, and each timeslot includes 7 symbols, where a cyclic prefix (CP, cyclic prefix) of symbol 0 may be 5.2 μs (160×1 Ts), a length of symbol 0 is 71.875 μs (2048 Ts+160 Ts), a CP length of symbol 1 to symbol 6 is 4.6875 μs (144×1 Ts), and a length of symbol 1 to symbol 6 is 71.354 μs (2048 Ts+144 Ts), where $1\ T_s=1/(15000\times2048)$s. One subframe in the time domain and 12 consecutive subcarriers in the frequency domain form one RB.

In addition, as shown in FIG. 3, a frame format (time-frequency configuration of the target communication resource) of a transmission link between LTE UE and MTC UE may be further designed, so that the transmission link has the following characteristics different from those of a downlink transmission link between the LTE UE and the access network device:

1. A subframe sent from the LTE UE to the MTC UE (hereinafter referred to as an H2L subframe) and a subframe sent from the MTC UE to the LTE UE (hereinafter referred to as an L2H subframe) may be included. That is, the H2L subframe may carry data or signaling sent by the LTE UE to the MTC UE, and the L2H subframe may carry data or signaling sent by the MTC UE to the LTE UE.

2. For a pair of LTE UE and MTC UE in communication, an H2L subframe and an L2H subframe of the LTE UE and the MTC UE may be separated by several preset subframes, where these subframes are referred to as "idle subframes" for the communication pair of LTE UE and MTC UE. The "idle subframes" means that the pair of MTC UE and LTE UE does not transmit data or signaling that is between the MTC UE and the LTE UE by using the idle subframes, so that the LTE UE performs, for example, receive/transmit transition processing or data demodulation and decoding processing with the MTC UE. A quantity of idle subframes (for example, idle subframes 1 shown in FIG. 3) between an H2L subframe and an L2H subframe may be or not be equal to a quantity of idle subframes (for example, idle subframes 2 shown in FIG. 3) between an L2H subframe and an H2L subframe, which is not specifically limited in the present invention. However, the quantity of idle subframes should be greater than or equal to, for example, receive/transmit transition processing time or demodulation and decoding processing time that is required for communication between the MTC UE and the LTE UE. For example, because data processing time does not exceed 3 ms in LTE, a quantity of idle subframes 1 and that of idle subframes 2 may both be three.

One H2L subframe and one closest subsequent L2H subframe form one subframe pair. An idle subframe is set between an H2L subframe and an L2H subframe of a subframe pair, and a quantity of the idle subframes may be preset.

Further, as shown in FIG. 4, the frame format (a frame format of the target communication resource) of the transmission link between the LTE UE and the MTC UE may have the following characteristics:

3. The target communication resource may be divided into an active period and a sleep period in terms of time, where the active period includes several subframe pairs. The LTE UE and the MTC UE perform communication in the active period and does not perform communication in the sleep period, so as to reduce power consumption. One active period and one sleep period form one communication cycle.

In addition, one active period includes one or more subframe pairs, and one sleep period includes zero, one, or more subframe pairs.

4. At the beginning of a communication cycle, there are one or more specific device discovery subframe pairs with a device discovery function, and then there are one or more general subframe pairs without a device discovery function. The device discovery subframe pair (that is, an example of the first target communication sub-resource and the second target communication sub-resource) may be used for device discovery and access processing between the LTE UE and the MTC UE. The general subframe pair (that is, an example of the third target communication sub-resource and the fourth target communication sub-resource) may be used for signaling and data transmission after access. The foregoing process is described in detail subsequently.

In addition, in this embodiment of the present invention, a mapping manner, on the target communication resource, of a reference signal sent by the MTC UE to the LTE UE may be one of reference mapping manners on the downlink system communication resource. That is, multiple types of reference signals may be used in communication between the LTE UE and the access network device, and mapping manners of all the reference signals may be different from each other. In this embodiment of the present invention, a mapping manner of a reference signal sent by the MTC UE to the LTE UE may be made the same as a transmission manner of any reference signal transmitted between the LTE UE and the access network device. For example, the mapping manner, on the target communication resource, of the reference signal sent by the MTC UE to the LTE UE may be the same as a mapping manner, on an LTE downlink transmission time-frequency resource, of a common reference signal (CRS, Common Reference Signal) in LTE downlink transmission, so that when receiving a signal sent by the MTC UE to the LTE UE, the LTE UE uses a channel estimation manner the same as that used when the LTE UE receives a downlink signal of the access network.

According to the data transmission method in this embodiment of the present invention, a time-frequency resource manner of a target communication resource is made the same as that of a system communication resource, and a mapping manner of a reference signal in a signal sent by an LCD to an HCD is a mapping manner of a reference signal in a signal sent by an access network device to the HCD, which can enable the HCD to use a same method and hardware device or similar methods and hardware devices (for example, a transceiver, channel estimation, or demodulation) to communicate with the LCD and the access network device, thereby reducing a cost of the HCD. In addition, the HCD proposed in this embodiment of the present invention forwards communication information between the LCD and an access network, which improves signal quality of communication between the LCD and the access network, thereby improving communication efficiency between the LCD and the access network.

It should be understood that, the configuration (or division manner) of the target communication resource and the resource mapping manner that are listed above are merely exemplary descriptions, which are not limited thereto in the present invention. All other time domain or frequency domain configuration manners and resource mapping manners that can be used for communication between two devices fall within the protection scope of the present invention. For example, configuration of the target communication resource may be determined according to a communications system formed by the HCD and the access network device, or a time domain or frequency domain resource configuration manner different from that in the prior art may be defined. A resource mapping manner different from that in the prior art may be further defined.

In addition, in this embodiment of the present invention, to reduce interference to user equipment (for ease of differentiation, hereinafter referred to as system UE) communicating with the access network device, when determining the target communication resource, the HCD may make the target communication resource a resource different from a system resource (that is, a resource used in a system formed by the system UE and the access network device) or make it an idle resource (that is, a system resource unused in the first time period) in the system resource. In a manner of determining the target communication resource, the HCD may detect and sense an idle resource other than a downlink transmission resource currently used in a system (for example, an LTE system).

According to the data transmission method in this embodiment of the present invention, a target communication resource used for communication between an HCD and an LCD is made different from a system communication resource used by an access network device when performing communication, which can avoid interference to another user equipment communicating with the access network device, thereby improving practicability of the data transmission method in the present invention.

Optionally, in this embodiment of the present invention, bandwidth of the target communication resource is less than or equal to bandwidth of the system communication resource.

Specifically, because an amount of data that an MTC device needs to transmit is small, bandwidth required by the MTC device is small. Therefore, the bandwidth of the target communication resource may be made less than the bandwidth of the system communication resource used by the access network device. For example, a part of bandwidth resources may be selected from idle resources of the system communication resource. For example, bandwidth of the system communication resource is 20 MHz, and a part of bandwidth resources may be selected from idle resources of the system communication resource, for example, a bandwidth of 1.08 M may be used as the target communication resource.

According to the data transmission method in this embodiment of the present invention, on a premise that communication of the MTC device is ensured, resource utilization can be effectively improved by reducing the bandwidth of the target communication resource.

After the target communication resource is determined as described above, the LTE UE#1 may send a discovery signal (an example of the first indication information) to the MTC UE by using a first discovery subframe (an example of the first target communication sub-resource) of a discovery subframe pair. Therefore, in S310, MTC UE#1 (an example of the first LCD) may detect the discovery signal.

Optionally, the first indication information is carried in a first synchronization signal; the first synchronization signal includes a first primary synchronization signal and a first secondary synchronization signal; a transmission relationship in a time domain between the first primary synchronization signal and the first secondary synchronization signal is different from a transmission relationship in a time domain between a second primary synchronization signal and a second secondary synchronization signal; the second primary synchronization signal and the second secondary synchronization signal are second synchronization signals; and the second synchronization signal is used to carry fifth indication information sent by the access network device, where the fifth indication information is used to indicate that the access network device is capable of transmitting data for the at least one HCD.

Specifically, as shown in FIG. 5a, in this embodiment of the present invention, the discovery signal may be transmitted in an H2L discovery subframe of the discovery subframe pair and includes a primary synchronization signal (for ease of differentiation, hereinafter referred to as a first primary synchronization signal) and a secondary synchronization signal (for ease of differentiation, hereinafter referred to as a first secondary synchronization signal), where the first primary synchronization signal and the first secondary synchronization signal each occupy one symbol. Information carried by the first primary synchronization signal and the first secondary synchronization signal and a method for generating and sending the first primary synchronization signal and the first secondary synchronization signal may be the same as information carried by a primary synchronization signal (for ease of differentiation, hereinafter referred to as a second primary synchronization signal) and a secondary synchronization signal (for ease of differentiation, hereinafter referred to as a second secondary synchronization signal) that are used by an access network device (for example, an eNB) accessed by the HCD (for example, the LTE UE#1) and a method for generating and sending the primary synchronization signal and the secondary synchronization signal, and description thereof is omitted herein to avoid redundancy. In addition, a relationship between a symbol carrying the first primary synchronization signal (which may also be referred to as a primary synchronization channel) and a symbol carrying the first secondary synchronization signal (which may also be referred to as a secondary synchronization channel) may be different from a relationship between a symbol carrying the second primary synchronization signal and a symbol carrying the second secondary synchronization signal in LTE, so as to prevent another LTE UE from accessing the HCD (for example, the LTE UE#1). Specifically, in LTE, the symbol carrying the second secondary synchronization signal is a symbol that is immediately prior to the symbol carrying the second primary synchronization signal. In contrast, in this embodiment of the present invention, for a link between the HCD and the LCD, the symbol carrying the first primary synchronization signal may be prior to (immediately prior to or separated by one or more symbols from) the symbol carrying the first secondary synchronization signal.

According to the data transmission method in this embodiment of the present invention, information carried by a discovery signal in a link between an HCD and an LCD and a manner of generating the discovery signal are made the same as information carried by a synchronization signal used by an access network device accessed by the HCD and a manner of generating the synchronization signal, which may enable the HCD to multiplex, when transmitting the discovery signal, a circuit used by the HCD to receive the synchronization signal of the access network device, thereby reducing a cost of the HCD. In addition, a configuration of the discovery signal in the link between the HCD and the LCD is made different from a configuration of a discovery signal used by the access network device, which can prevent another user equipment communicating with the access network device from incorrectly accessing the HCD, thereby improving practicability of the data transmission method in the present invention.

Therefore, in S320, after detecting the discovery signal, the MTC UE#1 may determine that the MTC UE#1 can perform data transmission with an eNB via the LTE UE#1 (an example of the first HCD), and may send a random access signal (an example of the second indication information) to the LTE UE#1, so as to perform access processing for the LTE UE#1. As shown in FIG. 5b, the MTC UE#1 may transmit the random access signal in an L2H subframe, specifically, in a physical random access channel (an example of the second target communication sub-resource) in the L2H subframe of the same discovery subframe pair (which is the same as the discovery subframe pair used by the LTE UE#1 to send the discovery signal in S310). In addition, the random access signal may use a format of an LTE uplink random access format 4, and occupy two consecutive symbols of the L2H subframe in terms of time; for example, the random access signal is in the second symbol and the third symbol of the L2H subframe.

In this embodiment of the present invention, the random access signal needs to carry identification information corresponding to the MTC UE#1, so that the LTE UE#1 confirms the MTC UE#1. Herein, the MTC UE#1 may randomly select one preamble from multiple random access sequences (preamble) as the identification information corresponding to the MTC UE#1.

In addition, a random access sequence (preamble) provided for selection of the MTC UE#1 may be determined according to a physical cell identifier (PCI, Physical Cell ID) of an eNB accessed by the LTE UE#1. The MTC UE#1 receives a device discovery signal of the LTE UE#1, from which the MTC UE#1 obtains a physical cell identifier of an access network device (for example, an eNB) accessed by the LTE UE#1. Generally, a quantity of Preambles (that is, a quantity of random access Preambles of one LTE cell) is no more than 64.

In addition, a quantity of preambles provided for selection of the MTC UE#1 may close to a maximum quantity of MTC UEs#1 served by each LTE UE#1; for example, if one HCD can transmit data for 15 LCDs at most, the quantity of preambles may be made 14. In this case, two Frank/Zadoff-Chu (FZC, Frank/Zadoff-Chu) sequences with different root sequences may be selected, and each root sequence has 7 different cyclic shifts (CS, cyclic shift) in total, where one root sequence is floor($n_{PCI}/7$), and the other root sequence is floor($n_{PCI}/7$)+1. Each initially accessed LCD may randomly select a CS and a root sequence. Multiple random access Preambles are numbered according to a preset rule, and a numbering manner may use a numbering manner the same as that of the LTE uplink random access format 4. A number of a Preamble selected by an LCD is determined by a CS and a root sequence that are selected by the LCD.

The LTE UE#1 receives the random access signal by using a physical random access channel (PRACH, Physical Random Access Channel), so as to acquire a CS and a root sequence that are selected by the MTC UE#1, and determines the MTC UE#1 according to the CS and the root sequence. Therefore, the LTE UE#1 may perform access processing for the MTC UE#1. For example, the LTE UE#1 may request an Internet Protocol (IP, Internet Protocol) address for the MTC UE#1 (for example, from an eNB).

It should be noted that, in this embodiment of the present invention, the LTE UE#1 may simultaneously serve multiple MTC UEs; therefore, the LTE UE#1 may allocate a unique link identifier (LID, link ID) to each pair of transmission links (including an uplink and a downlink) between the LTE UE#1 and one or more MTC UEs accessing the LTE UE#1 (including the MTC UE#1).

Optionally, the LTE UE#1 may further set one or more links with a special LID (for example, all zeros), where the link is used to send a broadcast signal to all MTC UEs accessing the LTE UE#1.

In this embodiment of the present invention, the LID may be expressed by using M bits, where M=ceil(log 2(max (number of link)+1)), max (number of link) represents a maximum quantity of links supported by the LTE UE#1, and a value of the max (number of link) may be pre-stipulated. For example, it may be stipulated that one HCD supports 15 LCDs at most, and therefore, the LID may be expressed by 4 bits.

In addition, the LTE UE#1 may send a random access response signal to the MTC UE#1, where the random access response signal carries an LID allocated to a link of the MTC UE#1. The random access response signal sent by the LTE UE#1 includes a sequence number of a Preamble of the random access signal of the MTC UE#1 received by the LTE UE#1, and the MTC UE#1 determines, according to this information, that the random access response signal is a random access response signal sent to the MTC UE#1.

The MTC UE#1 may determine, according to the random access response signal, the LID allocated to the MTC UE#1 by the LTE UE#1.

It should be noted that, if the MTC UE#1 does not receive the random access response signal in an H2L subframe after an L2H subframe carrying the random access signal, the MTC UE#1 may consider that previous random access fails, and may re-send a random access signal in an L2H subframe of a subsequent discovery subframe pair until a random access response signal is successfully received or a maximum quantity of times of retransmission is reached.

It should be understood that, access processing listed above is merely exemplary description. In this embodiment of the present invention, access processing performed by an LCD for an HCD may be similar to access processing performed by UE for an access network device. In addition, access processing performed by the HCD for the LCD may be similar to access processing performed by the access network device for the UE, and description thereof is omitted herein to avoid redundancy.

In addition, the communication process described above in which the MTC UE#1 accesses the LTE UE#1 may also be referred to as contention transmission. The LTE UE#1 does not allocate a dedicated communication resource to the MTC UE#1. That is, two symbols that are in an L2H subframe of each discovery subframe pair and carry a random access signal are not exclusively occupied by the MTC UE#1.

Then, the LTE UE#1 performs resource scheduling for the MTC UE#1. Specifically, the LTE UE#1 may allocate, to the MTC UE#1, a communication resource (which is specially used to transmit signaling and data between the LTE UE#1 and the MTC UE#1 and hereinafter referred to as a communication resource A) used for scheduling transmission. Therefore, in S330, the MTC UE#1 may determine the communication resource A.

In this embodiment of the present invention, the communication resource A may include a communication resource B (an example of a fourth sub-target communication resource) used to transmit physical layer control signaling and/or a communication resource C (an example of a third sub-target communication resource) used to transmit higher layer signaling and data.

The communication resource B may include, for example, a channel used to transmit a reference signal RS, a physical HARQ indicator channel PHICH, a physical schedule request channel PSRCH, and a physical resource grant channel PRGCH. The LTE UE#1 may allocate, to the MTC UE#1 according to a pre-defined rule, the communication resource B used to transmit physical layer control information. In addition, in this embodiment of the present invention, the LTE UE#1 may determine the communication resource B according to the same rule.

A rule of determining a communication resource transmitting an RS, for example, as shown in FIG. 6a and FIG. 6b, may be the same as a rule of determining a communication resource for a common reference signal in a transmission mode 1 of (LTE) an access network device; that is, the reference signal is transmitted in symbol #0 and symbol #4 of each timeslot. In a frequency domain, a reference signal transmitted in symbol #0 is carried in a subcarrier #0 and subcarrier #6 of an RB, and a reference signal transmitted in symbol #4 is carried in a subcarrier #4 and subcarrier #10 of an RB.

In a rule of determining a PRGCH, for example, as shown in FIG. 6a and FIG. 6b, the physical resource grant channel may be enabled to perform transmission in an H2L subframe, and the PRGCH occupies two consecutive symbols that are in the H2L subframe and do not include a reference signal RS. For example, in a discovery subframe pair, a primary synchronization channel and a secondary synchronization channel occupy symbol #1 and symbol #2 of timeslot 0 of an H2L subframe, and the PRGCH occupies symbol #5 and symbol #6 of timeslot 0; in an H2L subframe of a non-discovery subframe pair, the PRGCH occupies symbol #5 and symbol #6 of timeslot 0.

In a rule of determining a PHICH from the LTE UE#1 (HCD) to MTC UE (LCD), for example, eight PHICHs may be put into one group, where each group of PHICHs maps to a same physical resource. In this embodiment of the present invention, one resource block (1RB) may include 12 resource elements (RE, Resource Element), where one RE is equivalent to one transmission resource, and corresponds to one symbol in a time domain and one subcarrier in a frequency domain. Therefore, each group of PHICHs may be mapped to 12 REs, and the 12 REs may be evenly distributed in transmission bandwidth (6×12 subcarriers). For example, the 12 REs may be evenly distributed in an RE that is on symbol 0 of timeslot 0 of each subframe of a subframe pair and does not carry a reference signal. Specifically, as shown in FIG. 7, for example, REs corresponding to a first group of PHICHs are the number #1 subcarrier and number #7 subcarrier of each RB of symbol 0 of timeslot 0, and REs corresponding to a second group of PHICHs are the number #2 subcarrier and number #8 subcarrier of each RB of symbol 0 of timeslot 0. In addition, if there is a relatively large quantity of PHICH groups, another symbol may be pre-defined. For example, an RE that is on symbol 1 of timeslot 0 and does not carry a reference signal may also be used to transmit a PHICH group.

Similarly, in a rule of determining a PHICH from MTC UE (LCD) to the LTE UE#1 (HCD), eight PHICHs may be put into one group, where each group of PHICHs maps to a same physical resource. For example, a group of PHICHs may be mapped to 12 REs, and the 12 REs may be evenly distributed in transmission bandwidth (6×12 subcarriers). For example, the 12 REs may be evenly distributed in an RE that is on symbol 0 of timeslot 0 of each subframe of a subframe pair and does not carry a reference signal. Specifically, as shown in FIG. 7, for example, 12 REs of a first group of PHICHs may be corresponding to the number #1 subcarrier and number #7 subcarrier of each RB of symbol 0 of timeslot 0, and 12 REs of a second group of PHICHs may be corresponding to the number #2 subcarrier and number #8 subcarrier of each RB of symbol 0 of timeslot 0. If there is a relatively large quantity of PHICH groups, another symbol may be pre-defined. For example, an RE that is on symbol 1 of timeslot 0 and does not carry a reference signal may also be used to transmit a PHICH group.

In a rule of determining a PSRCH from MTC UE (LCD) to the LTE UE#1 (HCD), eight PRSCHs may be put into one group, and each group of PSRCHs maps to a same physical resource. For example, one group of PRSCHs may be mapped to 12 REs, and the 12 REs may be evenly distributed in transmission bandwidth (6×12 subcarriers). For example, the 12 REs may be evenly distributed in an RE that is on symbol 0 of timeslot 0 of each subframe of a subframe pair and does not carry a reference signal or a PHICH. Specifically, for example, as shown in FIG. 7, 12 REs of a first group of PRSCHs may be the number #3 subcarrier and number #9 subcarrier of each RB of symbol 0 of timeslot 0 in the transmission bandwidth, and 12 REs of a second group of PRSCHs may be the number #4 subcarrier and number #10 subcarrier of each RB of symbol 0 of timeslot 0.

In addition, the LTE UE#1 may allocate a downlink (from LTE UE to MTC UE) transmission resource (the communication resource C) and an uplink (from MTC UE to LTE UE) transmission resource (the communication resource C) to a transmission link between the LTE UE#1 and one or more MTC UEs (including the LTE UE#1) accessing the LTE UE#1, and transmit, by using the foregoing communication resource B, a resource allocation message indicating the communication resource C to each MTC UE.

The resource allocation message is differentiated by using the foregoing LID. As an example instead of a limitation, a type of resource allocation message may include an LID and resource allocation information. The resource allocation information may be used to indicate a frequency domain resource allocated to the link. In addition, in terms of a time domain resource, it may be stipulated that for a downlink, the time domain resource is a current H2L subframe; for an uplink, the time domain resource is an L2H subframe of a same subframe pair. It should be understood that, the content indicated by the resource allocation information listed above is merely exemplary description, which is not limited thereto in the present invention. All other manners that can enable the MTC UE to confirm a time-frequency resource allocated to the MTC UE by the LTE UE fall within the protection scope of the present invention. For example, the resource allocation information may not only indicate a frequency domain resource allocated to the link, but also may indicate a time domain resource allocated to the link.

In addition, the resource allocation information may be indicated in a bitmap (bitmap) manner. That is, a bit is allocated to each RB, so as to indicate whether to allocate the RB to the link.

Optionally, the resource allocation message may further carry a new data identifier, where the new data identifier may be used for a hybrid automatic repeat request (HARQ, Hybrid Automatic Repeat Request), so as to indicate whether data carried by the resource is initial transmission data or retransmission data.

Specifically, in this embodiment of the present invention, a transmission link between LTE UE and MTC UE may use a synchronous physical layer automatic feedback retransmission mechanism. The LTE UE sends data or signaling in an H2L subframe of a subframe pair, and after receiving the H2L subframe, the MTC UE sends acknowledgment (ACK)/non-acknowledgment (NACK) information in an L2H subframe (specifically, in a PHICH of the L2H subframe) of the same subframe pair. Alternatively, the MTC UE sends data or signaling in an L2H subframe of a subframe pair, and after receiving the L2H subframe, the LTE UE transmits ACK/NACK information in an H2L subframe (specifically, in a PHICH of the H2L subframe) of a subsequent subframe pair. ACK/NACK information of an H2L subframe is carried in a PHICH of an H2L subframe of a subframe pair, and ACK/NACK information of an L2H subframe is carried in a PHICH of an L2H subframe of a subframe pair.

Optionally, to simplify signaling design and reduce receiving complexity in this embodiment of the present invention, it may be stipulated that there is only one HARQ process in an uplink or a downlink; that is, when retransmission processing needs to be performed, same data is retransmitted only once.

In an embodiment of a transmission manner of the foregoing ACK/NACK information, binary phase shift keying (BPSK, Binary Phase Shift Keying) modulation may be performed on ACK/NACK information of each data packet; spread spectrum is performed on a modulated signal by a spreading factor, for example, 4; and repetition is performed on spread spectrum information for 3 times, thereby obtaining 12 data symbols after the spread spectrum and the repetition, and then the 12 symbols are mapped to a PHICH. A spread spectrum sequence number $n_{PHICH}^{seq}$ used by each link and a PHICH transmission resource group $n_{PHICH}^{group}$ to which each link is mapped may be uniquely determined by using an LID. For example, it may be stipulated that $n_{PHICH}^{seq}$=LinkID mod 8 and $$n_{PHICH}^{group} = \left\lfloor \frac{LinkID}{8} \right\rfloor,$$

where a correspondence between the spread spectrum sequence number and a spread spectrum sequence is the same as a correspondence in LTE.

In addition, in this embodiment of the present invention, the LTE UE may set multiple PHICH transmission groups, and each PHICH transmission group may be used to perform retransmission processing on one or more MTC UEs. Each PHICH transmission group includes 12 resource elements (RE, Resource Element), and different PHICH transmission groups correspond to different REs. Specifically, in a time domain, a PHICH transmission group is corresponding to a symbol pre-agreed on a transmission link, such as the first symbol, for example, symbol #0 of a timeslot #0; in a frequency domain, a PHICH transmission group may be evenly distributed in entire transmission bandwidth, for example, on 6 RBs.

In this embodiment of the present invention, a size of the resource allocation message may be a fixed value. If an size of an actual resource allocation message is less than the fixed value, any bit may be used to fill a remaining part.

In addition, a cyclic redundancy check code (CRC, Cyclic Redundancy Check) is used to check the resource allocation message, and the resource allocation message uses a modulation manner and a coding manner on which the MTC UE and the LTE UE may pre-agree by means of negotiation; for example, may use a 16-bit CRC check, and use quadrature phase shift keying (QPSK, Quadrature Phase Shift Keying) modulation and ⅓ rate tail-biting convolutional coding.

In this embodiment of the present invention, the resource allocation message may be transmitted to the MTC UE by using a PRGCH. The HCD and the LCD may pre-agree, by means of negotiation, on a time-frequency resource occupied by the PRGCH. For example, when the PRGCH occupies a two-symbol time-frequency resource, an agreement manner may be that the PRGCH occupies two consecutive symbols that do not include a reference signal RS. For example, as shown in FIG. 6a, in an H2L subframe of the foregoing general subframe pair, a first primary synchronization channel and a first secondary synchronization channel occupy symbol #1 and symbol #2 of timeslot 0, and the PRGCH occupies symbol #5 and symbol #6 of timeslot 0. As shown in FIG. 6b, in an H2L subframe of in a general subframe pair (which is specifically a subframe from LTE UE to MTC UE), the PRGCH occupies symbol #5 and symbol #6 of timeslot 0.

In S340, the MTC UE#1 and the LTE UE#1 may perform data transmission by using the allocated communication resource C described above.

For example, when the MTC UE#1 needs to transmit data (that is, uplink data) to the access network device via the LTE UE#1, the MTC UE#1 may send scheduling request information to the LTE UE#1 by using a PSRCH. In this embodiment of the present invention, it may be stipulated that, that a value of the scheduling request information is 1 means that scheduling a resource needs to be requested; and that the value of the scheduling request information is 0 means that there is no uplink data recently. A mapping manner, on a PRSCH, of the scheduling request information may be similar to a mapping manner, on a PHICH, of the ACK/NACK information. That is, BPSK modulation may be performed on each piece of scheduling request information; spread spectrum is performed on a modulated signal by a spreading factor, for example, 4; and repetition is performed on spread spectrum information for 3 times, thereby obtaining 12 data symbols after the spread spectrum and the repetition, and then the 12 symbols are mapped to a PSRCH. A spread spectrum sequence number $n_{PSRCH}^{seq}$ used by each link and a PSRCH transmission resource group $n_{PSRCH}^{group}$ to which each link is mapped may be uniquely determined by using an LID. For example, it may be stipulated that $n_{PSRCH}^{seq}$=LinkID mod 8 and $$n_{PSRCH}^{group} = \left\lfloor \frac{LinkID}{8} \right\rfloor,$$

where a correspondence between the spread spectrum sequence number and a spread spectrum sequence is the same as a correspondence in LTE.

In addition, in this embodiment of the present invention, the LTE UE may set multiple PSRCH transmission groups, and each PSRCH transmission group may be used to schedule one or more MTC UEs. Each PSRCH transmission group includes 12 resource elements (RE, Resource Element), and different PSRCH transmission groups correspond to different REs. Specifically, in a time domain, a PSRCH transmission group is corresponding to a symbol pre-agreed on a transmission link, such as the first symbol, for example, symbol #0 of a timeslot #0; in a frequency domain, a PSRCH transmission group may be evenly distributed in another remaining symbol in entire transmission bandwidth (for example, 6 RBs) except a symbol carrying a reference signal and a PHICH.

After receiving the scheduling request information, the LTE UE#1 may perform resource scheduling, for example, determine, from the foregoing communication resource C, a communication resource D (another example of the third sub-target communication resource) used to transmit uplink data, and sends information (an example of the third indication information) indicating the communication resource D to the MTC UE#1 by using, for example, a PSRCH (another example of a fourth sub-target communication resource).

Therefore, the MTC UE#1 may map the data to the communication resource D according to a transmission mode 1 of a PDSCH in LTE, and sends the mapped data to the LTE UE#1.

The LTE UE#1 may acquire the data from the communication resource D according to the transmission mode 1 of the PDSCH in LTE, and sends the data to a server.

For another example, if receiving downlink data that is from a server and needs to be transmitted to the LTE UE#1, the LTE UE#1 may perform resource scheduling. The LTE UE#1 determines, from the foregoing communication resource C, a communication resource E (still another example of the third sub-target communication resource) used to transmit downlink data, and sends information (another example of the third indication information) indicating the communication resource E to the MTC UE#1 by using, for example, a PSRCH (an example of a fourth sub-target communication resource). The downlink data is mapped to the communication resource E and transmitted to the MTC UE#1.

The LTE UE#1 may acquire the third indication information from the PSRCH, and therefore may acquire the downlink data from the communication resource E according to the third indication information.

Optionally, the sending, by the first LCD, first target data to the first HCD by using the third target communication sub-resource includes:

receiving, by the first LCD, fourth indication information that is sent by the first HCD by using a fifth target communication sub-resource in the target communication resource and used to indicate target transmission power, and determining the target transmission power according to the fourth indication information, where the target transmission power is determined by the first HCD according to strength of a system signal, and the system signal is a signal used to carry data or signaling transmitted between the HCD and the access network device; and sending, by the first LCD, the first target data to the first HCD according to the target transmission power by using the third target communication sub-resource.

Specifically, to avoid interference to another LTE UE in this embodiment of the present invention, the LTE UE#1 may detect a signal transmitted between the access network device and the another LTE UE, and determine, according to strength of the signal, maximum transmission power used to transmit the foregoing uplink data or downlink data. The maximum transmission power may be set to maximum transmit power that does not interfere with LTE cellular communication, which may be set by a cellular base station/cell accessed by the LTE UE#1, or may be calculated by the LTE UE#1 itself, or may be set to fixed maximum transmit power, for example, 0 dBm.

In addition, the LTE UE#1 may determine, according to the following formula, transmission power (that is, target transmission power) used to transmit MTC UE#1 data or data that is from the LTE UE#1 to the MTC UE#1, and target transmission power of the MTC UE#1 is used as an example:

$$P_{L2H}(i) = \min\begin{cases} P_{CMAX}(i) \\ 10\log_{10}(M_{L2H}(i)) + P_o + \alpha \cdot PL_{L2H} + f(i) \end{cases}$$

i indicates a serial number of a measured subframe; $P_{CMAX}(i)$ indicates maximum transmission power of the MTC UE#1 in a subframe i; M(i) indicates transmission bandwidth of the MTC UE#1; $P_o$ is a power control adjustment value; α is used to determine a ratio of open loop power control to a power setting; PL indicates a path loss from the LTE UE#1 to the MTC UE#1; f(i) indicates an accumulated closed-loop power control volume of the $i^{th}$ subframe.

In addition, in transmission of uplink data, the LTE UE#1 may send, to the MTC UE#1, information (hereinafter referred to as power indication information) used to indicate the target transmission power P(i) determined above or an increase/decrease of the target transmission power.

Therefore, the MTC UE#1 may send the uplink data according to the target transmission power.

In this embodiment of the present invention, the power indication information may be carried in a resource allocation message.

According to the data transmission method in this embodiment of the present invention, the target transmission power is determined according to strength of a system signal, so that transmission power used for communication between an HCD and an LCD decreases, which can reduce interference to another user equipment communicating with an access network device, thereby improving practicability of the data transmission method in the present invention.

In addition, in this embodiment of the present invention, because a communication distance between MTC UE and LTE UE is short, a transmission delay may fall within a CP range; therefore, transmission timing on an MTC UE side may be the same as transmission timing on an LTE UE side.

According to the data transmission method in this embodiment of the present invention, an HCD determines a communication resource used for data transmission with an LCD, and performs, with the LCD by using the communication resource, transmission of data that needs to be sent to an access network device or data acquired from the access network device, which can reliably enable the LCD to complete data transmission with the access network device, thereby improving a communication effect of the LCD and improving user experience of the LCD.

The data transmission method according to the embodiments of the present invention has been described above in detail with reference to FIG. 1 to FIG. 8. An apparatus used for data transmission according to the embodiments of the present invention are described in the following in detail with reference to FIG. 9 and FIG. 10.

Figure 9:
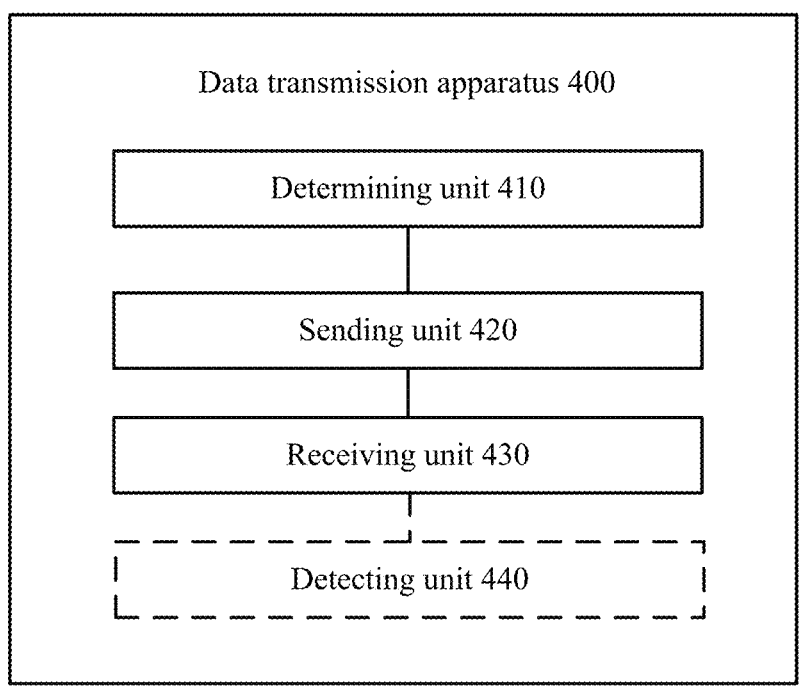
FIG. 9 is a schematic block diagram of a data transmission apparatus according to an embodiment of the present invention.

FIG. 9 shows a schematic block diagram of a data transmission apparatus 400 according to an embodiment of the present invention. As shown in FIG. 9, the apparatus 400 includes:

a determining unit 410, configured to determine a target communication resource in a first time period, where: the target communication resource is different from a downlink system communication resource in a system communication resource; the system communication resource is a resource used to transmit data or signaling between access network device and at least one high capability terminal device HCD capable of directly accessing the access network device; and the downlink system communication resource is a resource used by the access network device when the access network device transmits data or signaling to the HCD in the first time period;

a sending unit 420, configured to send first indication information by using a first target communication sub-resource in the target communication resource, where the first indication information is used to indicate that the apparatus is capable of transmitting data for at least one low capability terminal device LCD incapable of directly accessing the access network device; and a receiving unit 430, configured to receive second indication information that is sent by the first LCD by using a second target communication sub-resource in the target communication resource, where the second target communication sub-resource is corresponding to the first target communication sub-resource, and the second indication information is sent by the first LCD according to the first indication information and used to indicate that the first LCD requests to transmit data via the apparatus; where the determining unit 410 is further configured to determine, from the target communication resource according to the second indication information, a third target communication sub-resource used to transmit data between the first LCD and the apparatus;

the sending unit 420 is further configured to send third indication information to the first LCD by using a fourth target communication sub-resource in the target communication resource, where the third indication information is used to instruct the first LCD to perform data transmission with the apparatus by using the third target communication sub-resource; and the receiving unit 430 is further configured to receive first target data that is sent by the first LCD by using the third target communication sub-resource, and transmit the first target data to the access network device; and/or the sending unit 420 is further configured to send second target data acquired from the access network device to the first LCD by using the third target communication sub-resource.

Optionally, a time-frequency resource division manner of the target communication resource is the same as a time-frequency resource division manner of the system communication resource, and a data mapping manner of a reference signal carried by the target communication resource is a data mapping manner of a reference signal carried by the downlink system communication resource.

Optionally, the determining unit 410 is specifically configured to determine the target communication resource, so that bandwidth of the target communication resource is less than or equal to bandwidth of the system communication resource.

Optionally, the apparatus 400 further includes:

a detecting unit 440, configured to detect a system signal, where the system signal is a signal used to carry data or signaling transmitted between the at least one HCD capable of directly accessing the access network device and the access network device; where the determining unit 410 is further configured to determine a target transmission power according to strength of the system signal; and the sending unit 420 is further configured to send, to the first LCD by using a fifth target communication sub-resource in the target communication resource, fourth indication information used to indicate the target transmission power, so that the first LCD sends the first target data according to the target transmission power by using the third target communication sub-resource.

Optionally, the apparatus 400 further includes:

a detecting unit 440, configured to detect a system signal, where the system signal is a signal used to carry data or signaling transmitted between the at least one HCD capable of directly accessing the access network device and the access network device; where the determining unit 410 is further configured to determine the target transmission power according to strength of the system signal; and the sending unit 420 is specifically configured to send second target data to the first LCD according to the target transmission power by using the third target communication sub-resource.

Optionally, the first indication information is carried in a first synchronization signal; the first synchronization signal includes a first primary synchronization signal and a first secondary synchronization signal; a transmission relationship in a time domain between the first primary synchronization signal and the first secondary synchronization signal is different from a transmission relationship in a time domain between a second primary synchronization signal and a second secondary synchronization signal; the second primary synchronization signal and the second secondary synchronization signal are second synchronization signals; and the second synchronization signal is used to carry fifth indication information sent by the access network device, where the fifth indication information is used to indicate that the access network device is capable of transmitting data for the at least one HCD.

Optionally, the at least one LCD is an Internet of Things terminal device.

Optionally, the apparatus 400 is a mobile terminal device.

The data transmission apparatus 400 according to this embodiment of the present invention may correspond to an HCD (for example, LTE UE) in a method in an embodiment of the present invention. In addition, units and modules in the data transmission apparatus 400, and the foregoing other operations and/or functions are separately intended to implement a corresponding process of the method 200 in FIG. 2. For brevity, details are not described herein again.

According to the data transmission apparatus in this embodiment of the present invention, an HCD determines a communication resource used for data transmission with an LCD, and performs, with the LCD by using the communication resource, transmission of data that needs to be sent to an access network device or data acquired from the access network device, which can reliably enable the LCD to complete data transmission with the access network device, thereby improving a communication effect of the LCD and improving user experience of the LCD.

Figure 10:
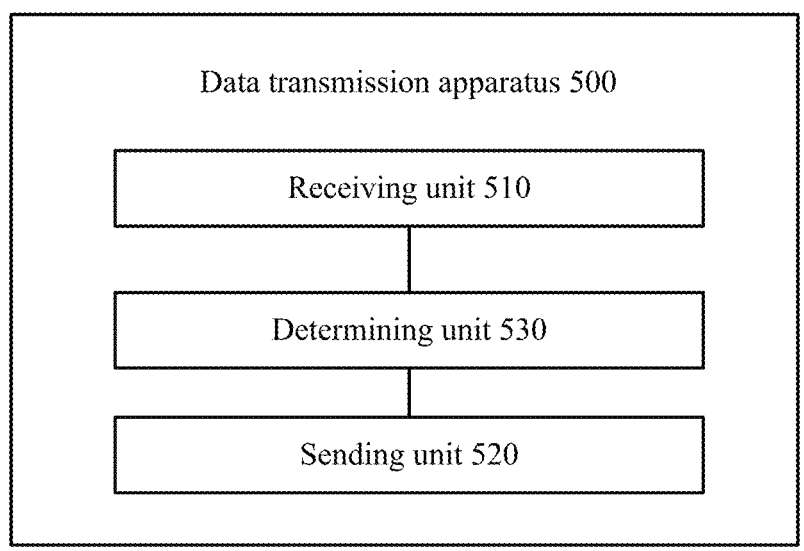
FIG. 10 is a schematic block diagram of a data transmission apparatus according to another embodiment of the present invention.

FIG. 10 shows a schematic block diagram of a data transmission apparatus 500 according to an embodiment of the present invention. As shown in FIG. 10, the apparatus 500 includes:

a receiving unit 510, configured to receive, in a first time period, first indication information sent by using a first target communication sub-resource in a target communication resource by a first HCD in at least one high capability terminal device HCD capable of directly accessing an access network device, where: the first indication information is used to indicate that the first HCD is capable of transmitting data for the apparatus; the target communication resource is determined by the first HCD, and the target communication resource is different from a downlink system communication resource in a system communication resource; the system communication resource is a resource used to transmit data or signaling between the access network device and the HCD; and the downlink system communication resource is a resource used by the access network device when the access network device transmits data or signaling to the HCD in the first time period;

a sending unit 520, configured to send second indication information to the first HCD according to the first indication information by using a second target communication sub-resource in the target communication resource, where the second target communication sub-resource is corresponding to the first target communication sub-resource, and the second indication information is used to indicate that the apparatus requests to transmit data via the first HCD; where the receiving unit 510 is further configured to receive third indication information that is sent by the first HCD according to the second indication information by using a fourth target communication sub-resource in the target communication resource and used to indicate a third target communication sub-resource, where the third target communication sub-resource is determined by the first HCD from the target communication resource and used to transmit data between a first LCD and the first HCD; and a determining unit 530, configured to determine the third target communication sub-resource according to the third indication information; where the sending unit 520 is further configured to send first target data to the first HCD by using the third target communication sub-resource, so that the first HCD transmits the first target data to the access network device; and/or the receiving unit 510 is further configured to receive second target data sent by the first HCD by using the third target communication sub-resource, where the second target data is acquired by the first HCD from the access network device.

Optionally, a time-frequency resource division manner of the target communication resource is the same as a time-frequency resource division manner of the system communication resource, and a data mapping manner of a reference signal carried by the target communication resource is a data mapping manner of a reference signal carried by the downlink system communication resource.

Optionally, the receiving unit 510 is further configured to receive fourth indication information that is sent by the first HCD by using a fifth target communication sub-resource in the target communication resource and used to indicate target transmission power, where the target transmission power is determined by the first HCD according to strength of a system signal, and the system signal is a signal used to carry data or signaling transmitted between the HCD and the access network device;

the determining unit 530 is further configured to determine the target transmission power according to the fourth indication information; and the sending unit 520 is specifically configured to send the first target data to the first HCD according to the target transmission power by using the third target communication sub-resource.

Optionally, the first indication information is carried in a first synchronization signal; the first synchronization signal includes a first primary synchronization signal and a first secondary synchronization signal; a transmission relationship in a time domain between the first primary synchronization signal and the first secondary synchronization signal is different from a transmission relationship in a time domain between a second primary synchronization signal and a second secondary synchronization signal; the second primary synchronization signal and the second secondary synchronization signal are second synchronization signals; and the second synchronization signal is used to carry fifth indication information sent by the access network device, where the fifth indication information is used to indicate that the access network device is capable of transmitting data for the at least one HCD.

Optionally, the apparatus 500 is an Internet of Things terminal device.

Optionally, the at least one HCD is a mobile terminal device.

The data transmission apparatus 500 according to this embodiment of the present invention may correspond to an LCD (for example, MTC UE) in a method in an embodiment of the present invention. In addition, units and modules in the data transmission apparatus 500, and the foregoing other operations and/or functions are separately intended to implement a corresponding process of the method 300 in FIG. 8. For brevity, details are not described herein again.

According to the data transmission apparatus in this embodiment of the present invention, an HCD determines a communication resource used for data transmission with an LCD, and performs, with the LCD by using the communication resource, transmission of data that needs to be sent to an access network device or data acquired from the access network device, which can reliably enable the LCD to complete data transmission with the access network device, thereby improving a communication effect of the LCD and improving user experience of the LCD.

Data transmission methods according to embodiments of the present invention are described above in detail with reference to FIG. 1 to FIG. 8. Devices used for data transmission according to the embodiments of the present invention are described in the following in detail with reference to FIG. 11 and FIG. 12.

Figure 11:
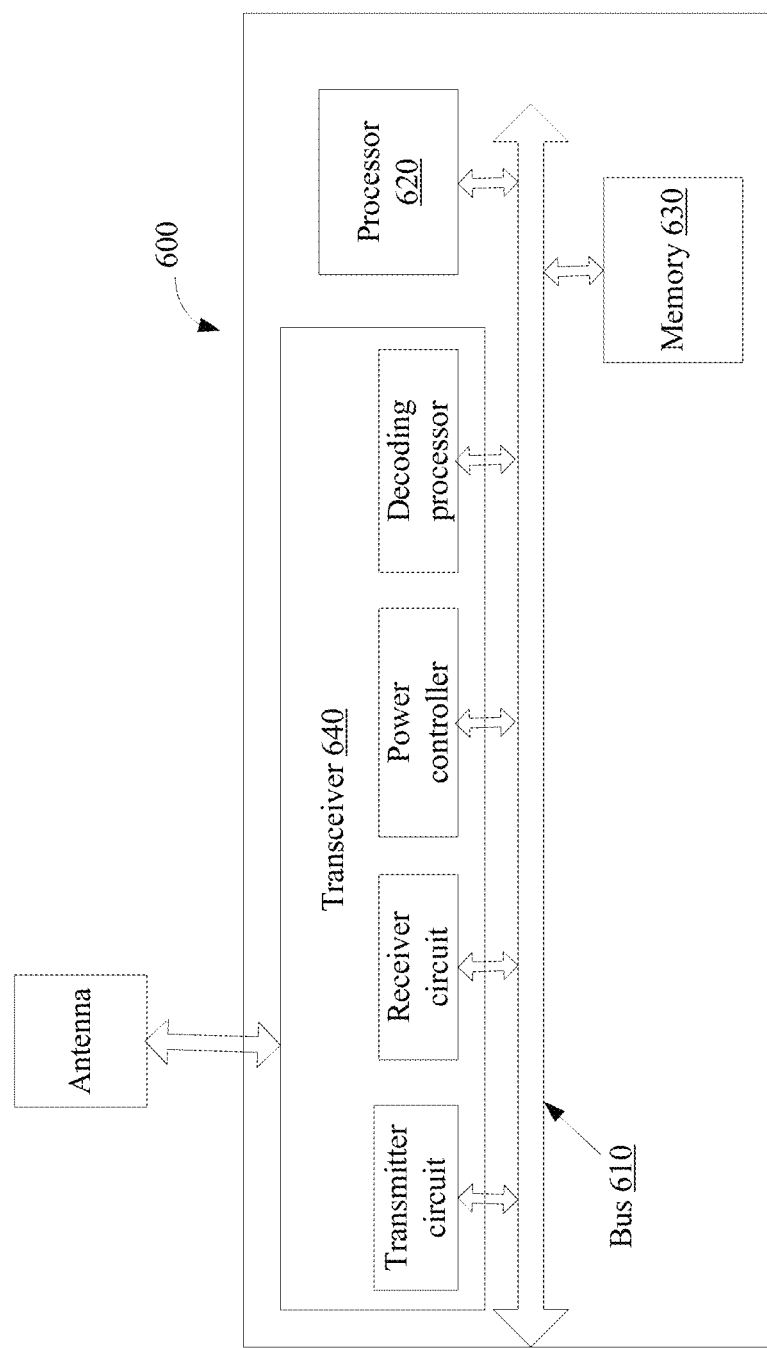
FIG. 11 is a schematic structural diagram of a data transmission device according to an embodiment of the present invention.

FIG. 11 shows a schematic block diagram of a data transmission device 600 according to an embodiment of the present invention. As shown in FIG. 11, the device 600 includes:

a bus 610;
a processor 620 connected to the bus 610;
a memory 630 connected to the bus 610; and
a transceiver 640 connected to the bus 610.

The processor 620 invokes, by using the bus 610, a program stored in the memory 630 to: determine, by a first HCD, a target communication resource in a first time period, where the target communication resource is different from a downlink system communication resource in a system communication resource; the system communication resource is a resource used to transmit data or signaling between a access network device and the HCD; and the downlink system communication resource is a resource used by the access network device when the access network device transmits data or signaling to the HCD in the first time period;

control the transceiver 640 to send first indication information by using a first target communication sub-resource in the target communication resource, where the first indication information is used to indicate that the device can transmit data for at least one low capability terminal device LCD incapable of directly accessing the access network device;

control the transceiver 640 to receive second indication information that is sent by the first LCD by using a second target communication sub-resource in the target communication resource, where the second target communication sub-resource is corresponding to the first target communication sub-resource, and the second indication information is sent by the first LCD according to the first indication information and used to indicate that the first LCD requests to transmit data via the apparatus;

determine, from the target communication resource according to the second indication information, a third target communication sub-resource used to transmit data between the first LCD and the apparatus;

control the transceiver 640 to send third indication information to the first LCD by using a fourth target communication sub-resource in the target communication resource, where the third indication information is used to instruct the first LCD to perform data transmission with the first HCD by using the third target communication sub-resource; and control the transceiver 640 to receive first target data that is sent by the first LCD by using the third target communication sub-resource, and transmit the first target data to the access network device; and/or control the transceiver 640 to send second target data acquired from the access network device to the first LCD by using the third target communication sub-resource.

Optionally, a time-frequency resource division manner of the target communication resource is the same as a time-frequency resource division manner of the system communication resource, and a data mapping manner of a reference signal carried by the target communication resource is a data mapping manner of a reference signal carried by the downlink system communication resource.

Optionally, the processor 620 is specifically configured to determine the target communication resource, so that bandwidth of the target communication resource is less than or equal to bandwidth of the system communication resource.

Optionally, the processor 620 is further configured to: control the transceiver 640 to detect a system signal, where the system signal is a signal used to carry data or signaling transmitted between at least one HCD capable of directly accessing the access network device and the access network device;

determine target transmission power according to strength of the system signal; and control the transceiver 640 to send, to the first LCD by using a fifth target communication sub-resource in the target communication resource, fourth indication information used to indicate the target transmission power, so that the first LCD sends the first target data according to the target transmission power by using the third target communication sub-resource.

Optionally, the processor 620 is further configured to: control the transceiver 640 to detect a system signal, where the system signal is a signal used to carry data or signaling transmitted between at least one HCD capable of directly accessing the access network device and the access network device;

determine the target transmission power according to strength of the system signal; and control the transceiver 640 to send second target data to the first LCD according to the target transmission power by using the third target communication sub-resource.

Optionally, the first indication information is carried in a first synchronization signal; the first synchronization signal includes a first primary synchronization signal and a first secondary synchronization signal; a transmission relationship in a time domain between the first primary synchronization signal and the first secondary synchronization signal is different from a transmission relationship in a time domain between a second primary synchronization signal and a second secondary synchronization signal; the second primary synchronization signal and the second secondary synchronization signal are second synchronization signals; and the second synchronization signal is used to carry fifth indication information sent by the access network device, where the fifth indication information is used to indicate that the access network device is capable of transmitting data for the at least one HCD.

Optionally, the at least one LCD is an Internet of Things terminal device.

Optionally, the device 600 is a mobile terminal device.

In this embodiment of the present invention, the transceiver 640 may include a transmitter circuit, a receiver circuit, a power controller, a decoding processor, and an antenna. The processor 620 may also be referred to as a CPU. The memory 630 may include a read-only memory and a random access memory, and provides an instruction and data for the processor 620. A part of the memory 630 may further include a nonvolatile random access memory (NVRAM). In a specific application, the device 600 may be built in or may be a wireless communication device itself, such as a mobile phone; and may further include a carrier accommodating the transmitter circuit and the receiver circuit, so as to allow data transmitting and receiving between the device 600 and a remote location. The transmitter circuit and the receiver circuit may be coupled to the antenna. All components of the device 600 are coupled together by using the bus 610, where the bus 610 may include a power bus, a control bus, and a state signal bus in addition to a data bus. However, for clarity of description, various buses are marked as the bus 610 in the figure.

The processor may implement or execute steps and logical block diagrams disclosed in the method embodiments of the present invention. A general purpose processor may be a microprocessor or the processor may also be any conventional processor, decoder, and the like. Steps of the methods disclosed with reference to the embodiments of the present invention may be directly executed and completed by means of a hardware processor, or may be executed and completed by using a combination of hardware and software modules in the decoding processor. The software module may be located in a mature storage medium in the art, such as a random access memory, a flash memory, a read-only memory, a programmable read-only memory, an electrically-erasable programmable memory, or a register. The storage medium is located in the memory 630, and the processor reads information in the memory 630 and completes the steps in the foregoing methods in combination with hardware of the processor.

It should be understood that in this embodiment of the present invention, the processor 620 may be a central processing unit (Central Processing Unit, "CPU" for short), or the processor 620 may also be another general purpose processor, a digital signal processor (DSP), an application-specific integrated circuit (ASIC), a field programmable gate array (FPGA), another programmable logic device, a discrete gate or transistor logic device, a discrete hardware assembly, or the like. A general purpose processor may be a microprocessor or the processor may also be any conventional processor and the like.

The memory 630 may include a read-only memory and a random access memory, and provides an instruction and data for the processor 620. A part of the memory 630 may further include a nonvolatile random access memory. For example, the memory 630 may further store information about a device type.

In an implementation process, the steps in the foregoing methods may be completed by using an integrated logic circuit of hardware in the processor 620 or an instruction in a form of software. Steps of the methods disclosed with reference to the embodiments of the present invention may be directly executed and completed by means of a hardware processor, or may be executed and completed by using a combination of hardware and software modules in the processor. The software module may be located in a mature storage medium in the art, such as a random access memory, a flash memory, a read-only memory, a programmable read-only memory, an electrically-erasable programmable memory, or a register.

The data transmission device 600 according to this embodiment of the present invention may correspond to an HCD (for example, LTE UE) in a method in an embodiment of the present invention. In addition, units and modules in the data transmission device 600, and the foregoing other operations and/or functions are separately intended to implement a corresponding process of the method 200 in FIG. 2. For brevity, details are not described herein again.

According to the data transmission device in this embodiment of the present invention, an HCD determines a communication resource used for data transmission with an LCD, and performs, with the LCD by using the communication resource, transmission of data that needs to be sent to an access network device or data acquired from the access network device, which can reliably enable the LCD to complete data transmission with the access network device, thereby improving a communication effect of the LCD and improving user experience of the LCD.

Figure 12:
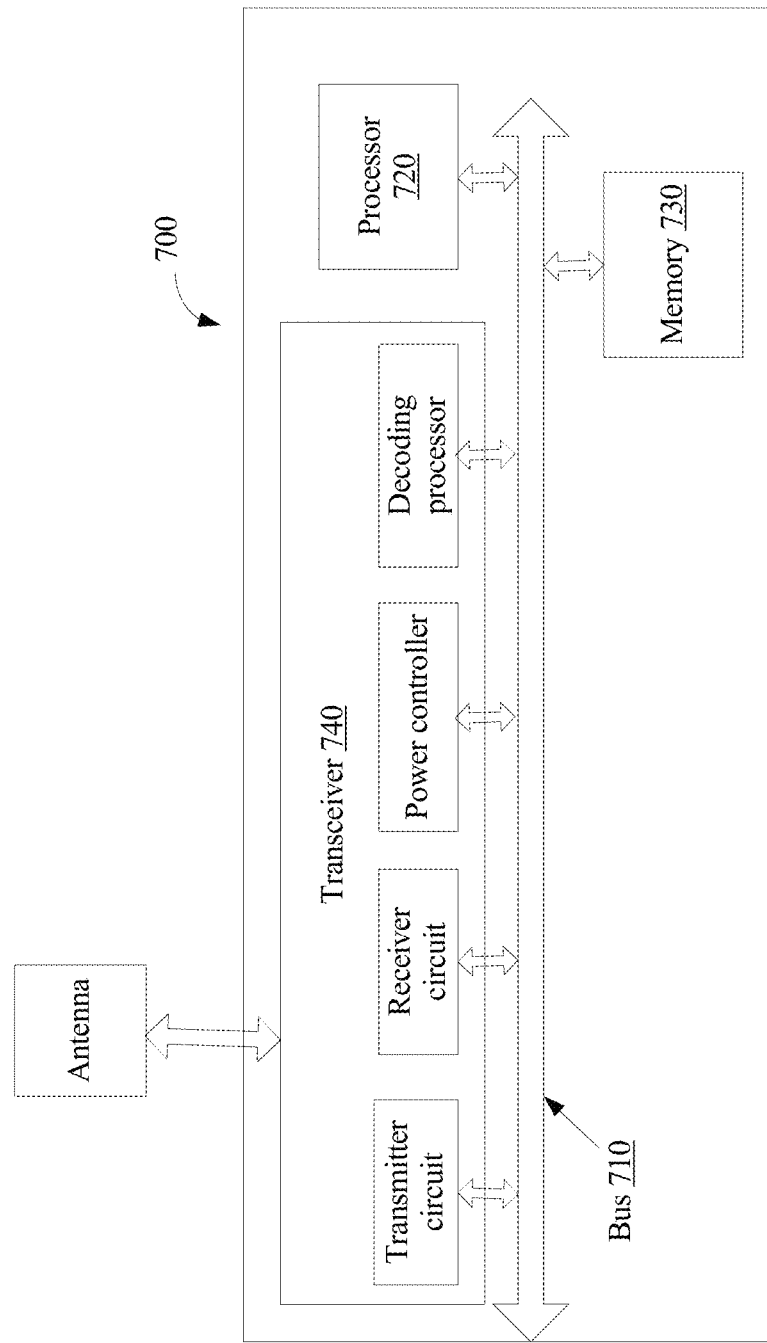
FIG. 12 is a schematic structural diagram of a data transmission device according to another embodiment of the present invention.

FIG. 12 shows a schematic block diagram of a data transmission device 700 according to an embodiment of the present invention. As shown in FIG. 12, the device 700 includes:

a bus 710;
a processor 720 connected to the bus 710;
a memory 730 connected to the bus 710; and
a transceiver 740 connected to the bus 710.

The processor 720 invokes, by using the bus 710, a program stored in the memory 730 to: control the transceiver 740 to receive, in a first time period, first indication information sent by using a first target communication sub-resource in a target communication resource by a first HCD in at least one high capability terminal device HCD capable of directly accessing an access network device, where the first indication information is used to indicate that the first HCD is capable of transmitting data for the apparatus; the target communication resource is determined by the first HCD, and the target communication resource is different from a downlink system communication resource in a system communication resource; the system communication resource is a resource used to transmit data or signaling between the access network device and the HCD; and the downlink system communication resource is a resource used by the access network device when the access network device transmits data or signaling to the HCD in the first time period;

control, according to the first indication information, the transceiver 740 to send second indication information to the first HCD by using a second target communication sub-resource in the target communication resource, where the second target communication sub-resource is corresponding to the first target communication sub-resource, and the second indication information is used to indicate that the apparatus requests to transmit data via the first HCD;

control the transceiver 740 to receive third indication information that is sent by the first HCD according to the second indication information by using a fourth target communication sub-resource in the target communication resource and used to indicate a third target communication sub-resource, where the third target communication sub-resource is determined by the first HCD from the target communication resource and used to transmit data between a first LCD and the first HCD;

determine the third target communication sub-resource according to the third indication information; and control the transceiver 740 to send first target data to the first HCD by using the third target communication sub-resource, so that the first HCD transmits the first target data to the access network device; and/or control the transceiver 740 to receive the second target data that is sent by the first HCD by using the third target communication sub-resource, where the second target data is acquired by the first HCD from the access network device.

Optionally, a time-frequency resource division manner of the target communication resource is the same as a time-frequency resource division manner of the system communication resource, and a data mapping manner of a reference signal carried by the target communication resource is a data mapping manner of a reference signal carried by the downlink system communication resource.

Optionally, bandwidth of the target communication resource is less than or equal to bandwidth of the system communication resource.

Optionally, the processor 720 is further configured to: control the transceiver 740 to receive fourth indication information that is sent by the first HCD by using a fifth target communication sub-resource in the target communication resource and used to indicate target transmission power, where the target transmission power is determined by the first HCD according to strength of a system signal, and the system signal is a signal used to carry data or signaling transmitted between the HCD and the access network device;

determine the target transmission power according to the fourth indication information; and control the transceiver 740 to send the first target data to the first HCD according to the target transmission power by using the third target communication sub-resource.

Optionally, the first indication information is carried in a first synchronization signal; the first synchronization signal includes a first primary synchronization signal and a first secondary synchronization signal; a transmission relationship in a time domain between the first primary synchronization signal and the first secondary synchronization signal is different from a transmission relationship in a time domain between a second primary synchronization signal and a second secondary synchronization signal; the second primary synchronization signal and the second secondary synchronization signal are second synchronization signals; and the second synchronization signal is used to carry fifth indication information sent by the access network device, where the fifth indication information is used to indicate that the access network device is capable of transmitting data for the at least one HCD.

Optionally, the device 700 is an Internet of Things terminal device.

Optionally, the at least one HCD is a mobile terminal device.

In this embodiment of the present invention, the transceiver 740 may include a transmitter circuit, a receiver circuit, a power controller, a decoding processor, and an antenna. The processor 720 may also be referred to as a CPU. The memory 730 may include a read-only memory and a random access memory, and provides an instruction and data for the processor 720. A part of the memory 730 may further include a nonvolatile random access memory (NVRAM). In a specific application, the device 700 may be built in or may be a wireless communication device itself, such as a mobile phone; and may further include a carrier accommodating the transmitter circuit and the receiver circuit, so as to allow data transmitting and receiving between the device 700 and a remote location. The transmitter circuit and the receiver circuit may be coupled to the antenna. All components of the device 700 are coupled together by using the bus 710, where the bus 710 may include a power bus, a control bus, and a state signal bus in addition to a data bus. However, for clarity of description, various buses are marked as the bus 710 in the figure.

The processor may implement or execute steps and logical block diagrams disclosed in the method embodiments of the present invention. A general purpose processor may be a microprocessor or the processor may also be any conventional processor, decoder, and the like. Steps of the methods disclosed with reference to the embodiments of the present invention may be directly executed and completed by means of a hardware processor, or may be executed and completed by using a combination of hardware and software modules in the decoding processor. The software module may be located in a mature storage medium in the art, such as a random access memory, a flash memory, a read-only memory, a programmable read-only memory, an electrically-erasable programmable memory, or a register. The storage medium is located in the memory 730, and the processor reads information in the memory 730 and completes the steps in the foregoing methods in combination with hardware of the processor.

It should be understood that in this embodiment of the present invention, the processor 720 may be a central processing unit (Central Processing Unit, "CPU" for short), or the processor 720 may also be another general purpose processor, a digital signal processor (DSP), an application-specific integrated circuit (ASIC), a field programmable gate array (FPGA), another programmable logic device, a discrete gate or transistor logic device, a discrete hardware assembly, or the like. A general purpose processor may be a microprocessor or the processor may also be any conventional processor and the like.

The memory 730 may include a read-only memory and a random access memory, and provides an instruction and data for the processor 720. A part of the memory 730 may further include a nonvolatile random access memory. For example, the memory 730 may further store information about a device type.

In an implementation process, the steps in the foregoing methods may be completed by using an integrated logic circuit of hardware in the processor 720 or an instruction in a form of software. Steps of the methods disclosed with reference to the embodiments of the present invention may be directly executed and completed by means of a hardware processor, or may be executed and completed by using a combination of hardware and software modules in the processor. The software module may be located in a mature storage medium in the art, such as a random access memory, a flash memory, a read-only memory, a programmable read-only memory, an electrically-erasable programmable memory, or a register.

The data transmission device 700 according to this embodiment of the present invention may correspond to an LCD (for example, MTC UE) in a method in an embodiment of the present invention. In addition, units and modules in the data transmission device 700, and the foregoing other operations and/or functions are separately intended to implement a corresponding process of the method 300 in FIG. 8. For brevity, details are not described herein again.

According to the data transmission device in this embodiment of the present invention, an HCD determines a communication resource used for data transmission with an LCD, and performs, with the LCD by using the communication resource, transmission of data that needs to be sent to an access network device or data acquired from the access network device, which can reliably enable the LCD to complete data transmission with the access network device, thereby improving a communication effect of the LCD and improving user experience of the LCD.

Figure 13:
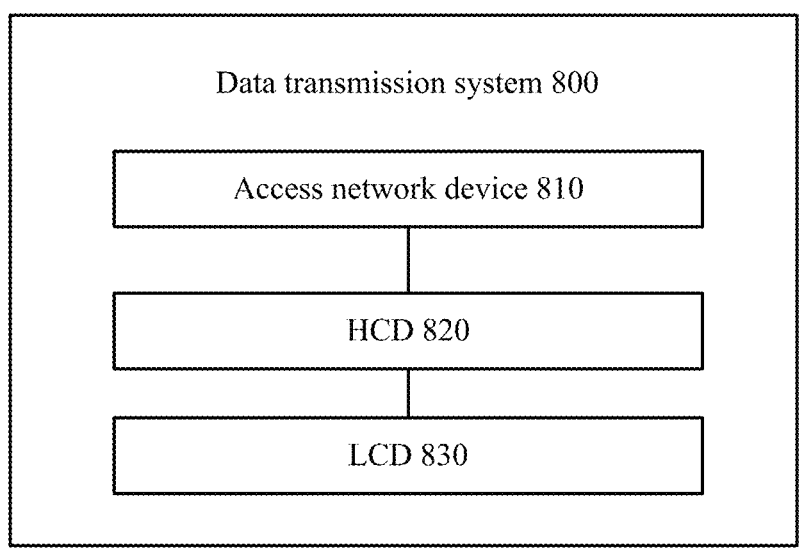
FIG. 13 is a schematic structural diagram of a data transmission system according to an embodiment of the present invention.

FIG. 13 shows a schematic block diagram of a data transmission system 800 according to an embodiment of the present invention. As shown in FIG. 13, the system 800 includes:

an access network device 810;

at least one high capability terminal device HCD 820 capable of directly accessing the access network device, configured to: determine a target communication resource in a first time period; send first indication information by using a first target communication sub-resource in the target communication resource, where the first indication information is used to indicate that the apparatus can transmit data for at least one low capability terminal device LCD incapable of directly accessing the access network device; receive second indication information that is sent by the first LCD by using a second target communication sub-resource in the target communication resource, where the second target communication sub-resource is corresponding to the first target communication sub-resource, and the second indication information is sent by the first LCD according to the first indication information and used to indicate that the first LCD requests to transmit data via the apparatus; determine, from the target communication resource according to the second indication information, a third target communication sub-resource used to transmit data between the first LCD and the apparatus; send third indication information to the first LCD by using a fourth target communication sub-resource in the target communication resource, where the third indication information is used to indicate the third target communication sub-resource; and receive first target data that is sent by the first LCD by using the third target communication sub-resource, and transmit the first target data to the access network device; and/or send second target data acquired from the access network device to the first LCD by using the third target communication sub-resource; and at least one low capability terminal device LCD 830 incapable of directly accessing the access network device, configured to: receive, in a first time period, first indication information sent by using a first target communication sub-resource in a target communication resource by a first HCD in at least one high capability terminal device HCD capable of directly accessing the access network device, where the first indication information is used to indicate that the first HCD is capable of transmitting data for the apparatus, and the target communication resource is determined by the first HCD; send second indication information to the first HCD according to the first indication information by using a second target communication sub-resource in the target communication resource, where the second target communication sub-resource is corresponding to the first target communication sub-resource, and the second indication information is used to indicate that the apparatus requests to transmit data via the first HCD; receive third indication information that is sent by the first HCD according to the second indication information by using a fourth target communication sub-resource in the target communication resource and used to indicate a third target communication sub-resource, where the third target communication sub-resource is determined by the first HCD from the target communication resource and used to transmit data between a first LCD and the first HCD; determine the third target communication sub-resource according to the third indication information; and send first target data to the first HCD by using the third target communication sub-resource, so that the first HCD transmits the first target data to the access network device; and/or receive the second target data that is sent by the first HCD by using the third target communication sub-resource, where the second target data is acquired by the first HCD from the access network device.

The target communication resource is different from a downlink system communication resource in a system communication resource, where the system communication resource is a resource used to transmit data or signaling between the access network device and the HCD, and the downlink system communication resource is a resource used by the access network device when the access network device transmits data or signaling to the HCD in the first time period.

Optionally, a time-frequency resource division manner of the target communication resource is the same as a time-frequency resource division manner of the system communication resource, and a data mapping manner of a reference signal carried by the target communication resource is a data mapping manner of a reference signal carried by the downlink system communication resource.

The HCD 820 according to this embodiment of the present invention may correspond to an HCD (for example, LTE UE) in a method in an embodiment of the present invention. In addition, units and modules in the HCD 820, and the foregoing other operations and/or functions are separately intended to implement a corresponding process of the method 200 in FIG. 2. For brevity, details are not described herein again.

The LCD 830 according to this embodiment of the present invention may correspond to an LCD (for example, MTC UE) in a method in an embodiment of the present invention. In addition, units and modules in the LCD 830, and the foregoing other operations and/or functions are separately intended to implement a corresponding process of the method 300 in FIG. 8. For brevity, details are not described herein again.

According to the data transmission system in this embodiment of the present invention, an HCD determines a communication resource used for data transmission with an LCD, and performs, with the LCD by using the communication resource, transmission of data that needs to be sent to an access network device or data acquired from the access network device, which can reliably enable the LCD to complete data transmission with the access network device, thereby improving a communication effect of the LCD and improving user experience of the LCD.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may be or not be physical units, and may be located in one position, or distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a portable hard drive, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method comprising:
    determining, by a first high capability terminal device (HCD) capable of directly accessing an access network device, a target communication resource in a first time period, wherein:
        a) the target communication resource is different from a downlink system communication resource in a system communication resource,
        b) the system communication resource is a resource used to transmit data or signaling between the access network device and the first HCD, and
        c) the downlink system communication resource is a resource used by the access network device for transmitting data or signaling to the first HCD in the first time period;
    sending, by the first HCD, first indication information to at least one low capability terminal device (LCD) incapable of directly accessing the access network device by using a first target communication sub-resource in the target communication resource, wherein the first indication information indicates that the first HCD is capable of transmitting data for the at least one LCD;
    receiving, by the first HCD, second indication information from a first LCD on a second target communication sub-resource in the target communication resource, wherein:
        a) the second target communication sub-resource and the first target communication sub-resource are in a same sub-resource pair, and
        b) the second indication information is sent by the first LCD according to the first indication information and indicates that the first LCD requests to transmit data via the first HCD;
    determining, by the first HCD, from the target communication resource according to the second indication information, a third target communication sub-resource for transmitting data between the first LCD and the first HCD, and sending third indication information to the first LCD on a fourth target communication sub-resource in the target communication resource, wherein the third indication information instructs the first LCD to perform data transmission with the first HCD by using the third target communication sub-resource; and
    receiving, by the first HCD, first target data from the first LCD on the third target communication sub-resource, and transmitting the first target data to the access network device; and/or acquiring, by the first HCD, second target data from the access network device, and sending the second target data to the first LCD on the third target communication sub-resource.

2. The method according to claim 1, wherein:
    a time-frequency resource division manner of the target communication resource is the same as a time-frequency resource division manner of the system communication resource; and
    a data mapping manner of a reference signal carried by the target communication resource is a data mapping manner of a reference signal carried by the downlink system communication resource.

3. The method according to claim 1, wherein bandwidth of the target communication resource is less than or equal to bandwidth of the system communication resource.

4. The method according to claim 1, wherein before receiving the first target data, the method further comprises:
    detecting, by the first HCD, a system signal for carrying data or signaling transmitted between the first HCD and the access network device;
    determining, by the first HCD, target transmission power according to strength of the system signal; and
    sending, by the first HCD to the first LCD on a fifth target communication sub-resource in the target communication resource, fourth indication information indicating the target transmission power, so as to instruct the first LCD to send the first target data according to the target transmission power by using the third target communication sub-resource.

5. The method according to claim 1, wherein sending the second target data to the first LCD on the third target communication sub-resource comprises:
    detecting, by the first HCD, a system signal for carrying data or signaling transmitted between the first HCD and the access network device;
    determining, by the first HCD, target transmission power according to strength of the system signal; and
    sending, by the first HCD, the second target data to the first LCD according to the target transmission power by using the third target communication sub-resource.

6. The method according to claim 1, wherein:
    the at least one LCD comprises at least one Internet of Things terminal device; and
    the first HCD is a mobile terminal device.

7. A data transmission method comprising:
    detecting, by a first low capability terminal device (LCD), in a first time period, first indication information from a first high capability terminal device (HCD) on a first target communication sub-resource in a target communication resource, wherein:
        a) the first LCD is incapable of directly accessing an access network device and the first HCD is capable of directly accessing the access network device,
        b) the first indication information indicates that the first HCD is capable of transmitting data for at least one LCD,
        c) the target communication resource is different from a downlink system communication resource in a system communication resource, the system communication resource being a resource used to transmit data or signaling between the access network device and the first HCD, and
        d) the downlink system communication resource is a resource used by the access network device for transmitting data or signaling to the first HCD in the first time period;
    sending, by the first LCD, second indication information to the first HCD, according to the first indication information, on a second target communication sub-resource in the target communication resource, wherein:
- a) the second target communication sub-resource and the first target communication sub-resource are in a same sub-resource pair, and
- b) the second indication information indicates that the first LCD requests to transmit data via the first HCD;

receiving, by the first LCD, third indication information from the first HCD on a fourth target communication sub-resource in the target communication resource, the third indication information indicating a third target communication sub-resource, wherein:
- a) the third target communication sub-resource is determined by the first HCD from the target communication resource according to the third indication information and is used to transmit data between the first LCD and the first HCD, and
- b) the third indication information is sent by the first HCD according to the second indication information; and sending, by the first LCD, first target data to the first HCD on the third target communication sub-resource, so that the first HCD transmits the first target data to the access network device; and/or receiving, by the first LCD, second target data from the first HCD on the third target communication sub-resource, wherein the second target data is acquired by the first HCD from the access network device.

8. The method according to claim 7, wherein a time-frequency resource division manner of the target communication resource is the same as a time-frequency resource division manner of the system communication resource, and
a data mapping manner of a reference signal carried by the target communication resource is a data mapping manner of a reference signal carried by the downlink system communication resource.

9. The method according to claim 7, wherein bandwidth of the target communication resource is less than or equal to bandwidth of the system communication resource.

10. The method according to claim 7, wherein sending the first target data to the first HCD by using the third target communication sub-resource comprises:
receiving, by the first LCD, fourth indication information indicating target transmission power from the first HCD on a fifth target communication sub-resource in the target communication resource, wherein the target transmission power is determined according to strength of a system signal used to carry data or signaling transmitted between the first HCD and the access network device; and
sending, by the first LCD, the first target data to the first HCD according to the target transmission power by using the third target communication sub-resource.

11. The method according to claim 7, wherein:
the at least one LCD comprises at least one Internet of Things terminal device; and
the first HCD is a mobile terminal device.

12. A non-transitory computer-readable medium having processor-executable instructions stored thereon for a data transmission method, the processor-executable instructions, when executed, facilitating performance of the following:
determining, by a first high capability terminal device (HCD) capable of directly accessing an access network device, a target communication resource in a first time period, wherein:
- a) the target communication resource is different from a downlink system communication resource in a system communication resource,
- b) the system communication resource is a resource used to transmit data or signaling between the access network device and the first HCD, and
- c) the downlink system communication resource is a resource used by the access network device for transmitting data or signaling to the first HCD in the first time period;

sending, by the first HCD, first indication information to at least one low capability terminal device (LCD) incapable of directly accessing the access network device by using a first target communication sub-resource in the target communication resource, wherein the first indication information is indicates that the first HCD is capable of transmitting data for the at least one LCD;

receiving, by the first HCD, second indication information from a first LCD on a second target communication sub-resource in the target communication resource, wherein:
- a) the second target communication sub-resource and the first target communication sub-resource are in a same sub-resource pair, and
- b) the second indication information is sent by the first LCD according to the first indication information and indicates that the first LCD requests to transmit data via the first HCD;

determining, by the first HCD, from the target communication resource according to the second indication information, a third target communication sub-resource for transmitting data between the first LCD and the first HCD, and sending third indication information to the first LCD on a fourth target communication sub-resource in the target communication resource, wherein the third indication information instructs the first LCD to perform data transmission with the first HCD by using the third target communication sub-resource; and receiving, by the first HCD, first target data from the first LCD on the third target communication sub-resource, and transmitting the first target data to the access network device; and/or acquiring, by the first HCD, second target data from the access network device, and sending the second target data to the first LCD on the third target communication sub-resource.

13. The non-transitory computer-readable medium according to claim 12, wherein:
a time-frequency resource division manner of the target communication resource is the same as a time-frequency resource division manner of the system communication resource, and
a data mapping manner of a reference signal carried by the target communication resource is a data mapping manner of a reference signal carried by the downlink system communication resource.

14. The non-transitory computer-readable medium according to claim 12, wherein bandwidth of the target communication resource is less than or equal to bandwidth of the system communication resource.

15. The non-transitory computer-readable medium according to claim 12, wherein before receiving the first target data, the processor executable instructions, when executed, further facilitate performance of the following:
detecting, by the first HCD, a system signal for carrying data or signaling transmitted between the first HCD and the access network device;

determining, by the first HCD, target transmission power according to strength of the system signal; and sending, by the first HCD to the first LCD by using on a fifth target communication sub-resource in the target communication resource, fourth indication information indicating the target transmission power, so as to instruct the first LCD to send the first target data according to the target transmission power by using the third target communication sub-resource.

16. The non-transitory computer-readable medium according to claim 12, wherein sending the second target data to the first LCD by using the third target communication sub-resource comprises:

detecting, by the first HCD, a system signal for carrying data or signaling transmitted between the first HCD and the access network device;

determining, by the first HCD, target transmission power according to strength of the system signal; and sending, by the first HCD, the second target data to the first LCD according to the target transmission power by using the third target communication sub-resource.

17. The non-transitory computer-readable medium according to claim 12, wherein:

the at least one LCD comprises at least one Internet of Things terminal device; and the first HCD is a mobile terminal device.

18. A non-transitory computer-readable medium having processor-executable instructions stored thereon for a data transmission method, the processor-executable instructions, when executed, facilitating performance of the following:

detecting, by a first low capability terminal device (LCD), in a first time period, first indication information from a first high capability terminal device (HCD) on a first target communication sub-resource in a target communication resource, wherein:

a) the first LCD is incapable of directly accessing an access network device and the first HCD is capable of directly accessing the access network device, b) the first indication information indicates that the first HCD is capable of transmitting data for at least one LCD, c) the target communication resource is different from a downlink system communication resource in a system communication resource, the system communication resource being a resource used to transmit data or signaling between the access network device and the first HCD, and d) the downlink system communication resource is a resource used by the access network device for transmitting data or signaling to the first HCD in the first time period;

sending, by the first LCD, second indication information to the first HCD, according to the first indication information, on a second target communication sub-resource in the target communication resource, wherein:

a) the second target communication sub-resource and the first target communication sub-resource are in a same sub-resource pair, and b) the second indication information indicates that the first LCD requests to transmit data via the first HCD;

receiving, by the first LCD, third indication information from the first HCD on a fourth target communication sub-resource in the target communication resource, the third indication information indicating a third target communication sub-resource, wherein:

a) the third target communication sub-resource is determined by the first HCD from the target communication resource according to the third indication information and is used to transmit data between the first LCD and the first HCD, and b) the third indication information is sent by the first HCD according to the second indication information; and sending, by the first LCD, first target data to the first HCD on the third target communication sub-resource, so that the first HCD transmits the first target data to the access network device; and/or receiving, by the first LCD, second target data from the first HCD on the third target communication sub-resource, wherein the second target data is acquired by the first HCD from the access network device.

19. The non-transitory computer-readable medium according to claim 18, wherein a time-frequency resource division manner of the target communication resource is the same as a time-frequency resource division manner of the system communication resource, and a data mapping manner of a reference signal carried by the target communication resource is a data mapping manner of a reference signal carried by the downlink system communication resource.

20. The non-transitory computer-readable medium according to claim 18, wherein bandwidth of the target communication resource is less than or equal to bandwidth of the system communication resource.

21. The non-transitory computer-readable medium according to claim 18, wherein sending the first target data to the first HCD by using the third target communication sub-resource comprises:

receiving, by the first LCD, fourth indication information indicating target transmission power from the first HCD on a fifth target communication sub-resource in the target communication resource, wherein the target transmission power is determined according to strength of a system signal used to carry data or signaling transmitted between the first HCD and the access network device; and sending, by the first LCD, the first target data to the first HCD according to the target transmission power by using the third target communication sub-resource.

22. The non-transitory computer-readable medium according to claim 18, wherein:

the at least one LCD comprises at least one Internet of Things terminal device; and the first HCD is a mobile terminal device.

* * * * *